United States Patent
Kim et al.

(10) Patent No.: US 11,974,185 B2
(45) Date of Patent: Apr. 30, 2024

(54) METHOD AND DEVICE FOR HANDOVER WITHOUT SUSPENSION OF DATA TRANSMISSION AND RECEPTION IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 17/593,814

(22) PCT Filed: Mar. 27, 2020

(86) PCT No.: PCT/KR2020/004191
§ 371 (c)(1),
(2) Date: Sep. 24, 2021

(87) PCT Pub. No.: WO2020/197315
PCT Pub. Date: Oct. 1, 2020

(65) Prior Publication Data
US 2022/0191760 A1    Jun. 16, 2022

(30) Foreign Application Priority Data
Mar. 28, 2019 (KR) .................. 10-2019-0035812

(51) Int. Cl.
*H04W 36/18* (2009.01)
*H04L 1/08* (2006.01)
(Continued)

(52) U.S. Cl.
CPC ............... *H04W 36/18* (2013.01); *H04L 1/08* (2013.01); *H04L 1/1812* (2013.01);
(Continued)

(58) Field of Classification Search
CPC ..... H04W 36/16; H04W 36/18; H04W 36/22; H04W 36/0005; H04W 36/0016;
(Continued)

(56) References Cited

U.S. PATENT DOCUMENTS 10,314,005 B2    6/2019  Kim et al.
2015/0173120 A1* 6/2015  Yamada ............... H04W 76/11
                                                      370/331
(Continued)

FOREIGN PATENT DOCUMENTS

WO    WO-2018175809 A1 *  9/2018  ........ H04W 36/0077

OTHER PUBLICATIONS

International Search Report and Written Opinion of the International Searching Authority dated Jul. 6, 2020, in connection with International Application No. PCT/KR2020/004191, 9 pages.
(Continued)

*Primary Examiner* — Kevin D Mew

(57) ABSTRACT

The present disclosure relates to a communication technique which combines a 5G communication system, for supporting a higher data transmission rate than 4G systems, with IoT technology, and a system for same. The present invention may be applied to intelligent services (for example, smart homes, smart buildings, smart cities, smart cars or connected cars, health care, digital education, smart retailers, security and safety-related services, or the like) based on 5G communication technology and IoT-related technology. The present disclosure relates to a method and device for performing an efficient handover, without the suspension of data transmission and reception, upon handover in a next generation mobile communication system.

20 Claims, 14 Drawing Sheets

(51) Int. Cl.
  *H04L 1/1812* (2023.01)
  *H04W 36/00* (2009.01)
  *H04W 74/0833* (2024.01)

(52) U.S. Cl.
  CPC ... *H04W 36/0022* (2013.01); *H04W 36/0069* (2018.08); *H04W 74/0833* (2013.01)

(58) Field of Classification Search
  CPC ....... H04W 36/0022; H04W 36/00222; H04W 36/0058; H04W 36/0069; H04W 74/0833; H04L 1/08; H04L 1/1812
  See application file for complete search history.

(56) References Cited

U.S. PATENT DOCUMENTS

| | | | |
|---|---|---|---|
| 2016/0119840 A1 | 4/2016 | Loehr et al. | |
| 2018/0241653 A1* | 8/2018 | Pelletier | H04L 43/0811 |
| 2018/0279186 A1* | 9/2018 | Park | H04W 36/30 |
| 2018/0279375 A1* | 9/2018 | Jeon | H04W 74/0833 |
| 2018/0279376 A1* | 9/2018 | Dinan | H04W 52/50 |
| 2020/0296635 A1* | 9/2020 | Rastegardoost | H04W 72/23 |
| 2020/0314664 A1* | 10/2020 | Zhou | H04L 25/0226 |
| 2020/0314717 A1* | 10/2020 | Kim | H04W 36/18 |
| 2020/0314812 A1* | 10/2020 | Xu | H04W 72/23 |
| 2021/0105675 A1* | 4/2021 | Kim | H04W 80/08 |

OTHER PUBLICATIONS

Ericsson, "Enhancements to Make-Before-Break," R2-1817396, 3GPP TSG-RAN WG2 #104, Spokane, USA, Nov. 12-16, 2019, 5 pages.

Ericsson, "Reporting RLM related issues upon handover and access to the target cell," R3-190834, 3GPP TSG-RAN WG3 #103, Athens, Greece, Feb. 25-Mar. 1, 2019, 6 pages.

NEC, "Scenarios for handover robustness improvements in Nr," R2-1901004, 3GPP TSG-RAN WG2 #105, Athens, Greece, Feb. 25-Mar. 1, 2019, 4 pages.

Nokia, et al., "Report from [104#61][LTE/feMOB] Solution directions for minimizing user data interruption for UL/DL (Nokia)," R2-1900619, 3GPP TSG-RAN WG2 Meeting #105, Athens, Greece, Feb. 25-Mar. 1, 2019, 49 pages.

* cited by examiner

METHOD AND DEVICE FOR HANDOVER WITHOUT SUSPENSION OF DATA TRANSMISSION AND RECEPTION IN NEXT GENERATION MOBILE COMMUNICATION SYSTEM

CROSS-REFERENCE TO RELATED APPLICATIONS

This application is a 371 National Stage of International Application No. PCT/KR2020/004191, filed Mar. 27, 2020, which claims priority to Korean Patent Application No. 10-2019-0035812, filed Mar. 28, 2019, the disclosures of which are herein incorporated by reference in their entirety.

BACKGROUND

1. Field

The disclosure relates to an efficient handover method and device without interruption of data transmission and reception during handover in a next generation mobile communication system.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and output (MIMO), full dimensional MIMO (FD-MIMO), array antenna, analog beamforming, and large scale antenna have been discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation have been developed. In addition, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, have been developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network have been undertaken. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of fusion of 5G technology and IoT technology.

SUMMARY

In a next generation mobile communication system, an efficient handover method is needed to support a service without data interruption with low transmission delay.

According to an embodiment of the disclosure, a method performed by a UE in a wireless communication system includes receiving, from a first base station, a message instructing handover to a second base station; generating a second medium access control (MAC) entity related to the second base station while maintaining a first MAC entity related to the first base station based on the message; initiating a random access procedure to the second base station through the second MAC entity; performing uplink data transmission and downlink data reception with the first base station until the random access procedure is completed; starting uplink data transmission and downlink data reception with the second base station, as the random access procedure is completed; and receiving downlink data from the first base station after the random access procedure is completed.

According to another embodiment of the disclosure, a method performed by a first base station in a wireless communication system includes transmitting, to a UE, a message instructing handover to a second base station; performing uplink data reception and downlink data transmission with the terminal until a random access procedure to the second base station by the UE is completed; and transmitting downlink data to the UE after the random access procedure is completed, wherein a first medium access control (MAC) entity of the UE related to the first base station is maintained even after the message is transmitted, and a second MAC entity of the terminal related to the second base station is generated based on the message, and the random access procedure is initiated through the second MAC entity.

According to another embodiment of the disclosure, a UE for a wireless communication system includes a transceiver configured to transmit and receive a signal; and a controller connected to the transceiver, wherein the controller is configured to receive a message instructing handover from a first base station to a second base station, to generate a second medium access control (MAC) entity related to the second base station while maintaining a first MAC entity related to the first base station based on the message, to initiate a random access procedure to the second base station through the second MAC entity, to perform uplink data transmission and downlink data reception with the first base station until the random access procedure is completed, to start uplink data transmission and downlink data reception with the second base station, as the random access procedure is completed, and to receive downlink data from the first base station after the random access procedure is completed.

According to another embodiment of the disclosure, a first base station for a wireless communication system includes a transceiver configured to transmit and receive a signal; and a controller connected to the transceiver, wherein the controller is configured to transmit a message instructing handover to the second base station to the UE, to perform uplink data reception and downlink data transmission with the UE until a random access procedure to the second base station by the UE is completed, and to transmit downlink data to the terminal after the random access procedure is completed, wherein a first medium access control (MAC) entity of the terminal related to the first base station is maintained even after the message is transmitted, a second MAC entity of the terminal related to the second base station is generated based on the message, and the random access procedure is initiated through the second MAC entity.

The disclosure proposes various efficient handover methods for preventing a data interruption time from occurring due to handover when handover is performed in a next generation mobile communication system, so that a service without data interruption can be supported.

DETAILED DESCRIPTION

Figure 1:
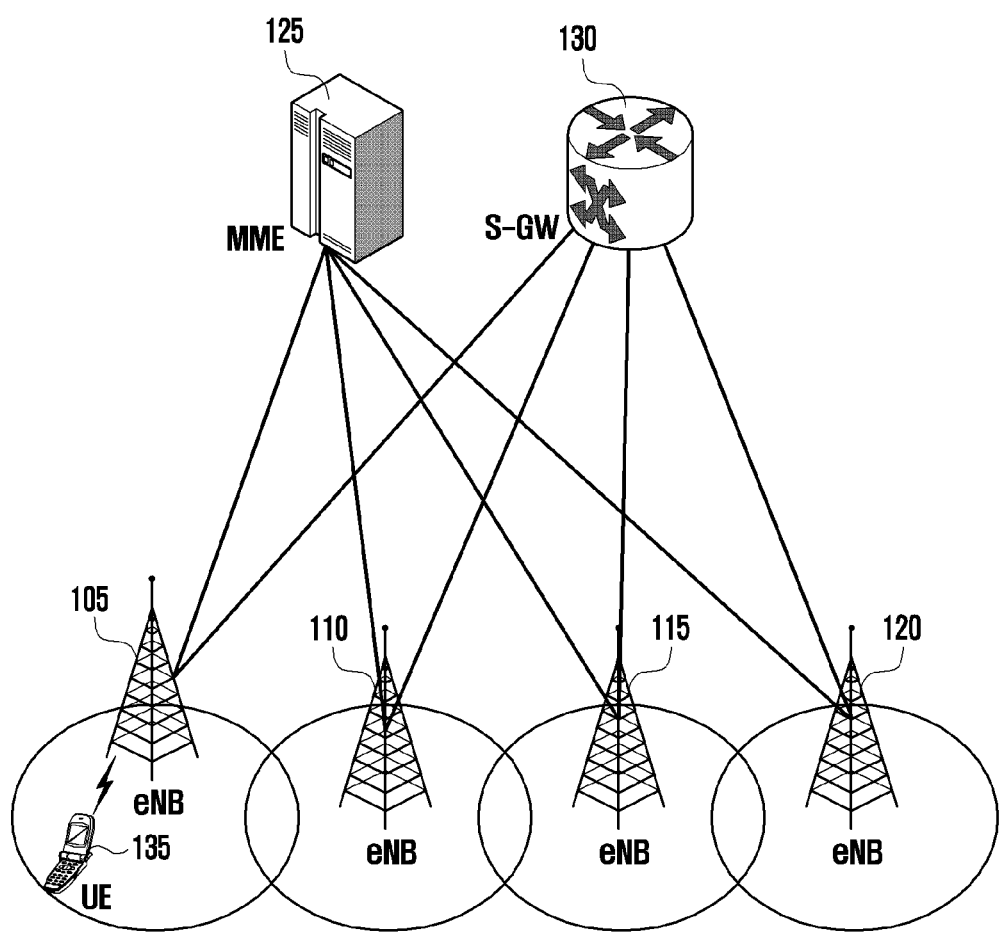
FIG. 1 is a diagram illustrating a structure of an LTE system to which the disclosure can be applied.

Hereinafter, the operating principle of the disclosure will be described in detail with reference to the accompanying drawings. In the following description, when it is determined that a detailed description of a known function or configuration related to the disclosure may unnecessarily obscure the subject matter of the disclosure, a detailed description thereof will be omitted. Terms to be described later are terms defined in consideration of functions in the disclosure, which may vary according to intentions or customs of users and operators. Therefore, the definition should be made based on the content throughout this specification.

In the following description, when describing of the disclosure, when it is determined that a detailed description of a related well-known function or configuration of the disclosure may unnecessarily obscure the subject matter of the disclosure, a detailed description thereof will be omitted. Hereinafter, embodiments of the disclosure will be described with reference to the accompanying drawings.

A term for identifying an access node used in the following description, a term for indicating network entities, a term for indicating messages, a term for indicating an interface between network objects, a term for indicating various identification information and the like are exemplified for convenience of description. Accordingly, the disclosure is not limited to terms described below, and other terms referring to objects having an equivalent technical meaning may be used.

Hereinafter, for convenience of description, the disclosure may use terms and names defined in the 3rd generation partnership project long term evolution (3GPP LTE) standard. However, the disclosure is not limited by the above terms and names, and may be equally applied to systems according to other standards. In the disclosure, an evolved node B (eNB) may be used together with a next generation node B (gNB) for convenience of description. That is, a base station described as an eNB may represent a gNB.

The disclosure may propose handover methods without interruption capable of minimizing or reducing a data interruption time due to handover to 0 ms in a next generation mobile communication system.

Specifically, efficient handover methods proposed in the disclosure may have one or two or more of the following plurality of features.

When the UE that performs data transmission and reception (uplink or downlink data transmission and reception) with a source base station through each protocol layer device (PHY layer device, MAC layer device, RLC layer device, or PDCP layer device) of a first plurality of bearers receives a handover command message (e.g., handover command message or RRC Reconfiguration message) from the source base station, it may be characterized that the UE configures protocol layer devices of a new second plurality of bearers corresponding to the protocol layer devices of the first plurality of bearers (e.g., having the same bearer identifier), and continue to maintain data transmission and reception (uplink or downlink data transmission and reception) without interruption with the source base station through the first plurality of bearers, and performs data transmission and reception (uplink or downlink data transmission and reception).

In the above description, after the handover command message is received, it may be characterized that protocol layer devices (PHY layer device, MAC layer device, RLC layer device, or PDCP layer device) of the second plurality of bearers that are newly established are configured for data transmission and reception with the target base station based on bearer configuration information or protocol layer device information included in the handover command message.

In the above description, it may be characterized that the UE performs a random access procedure to the target base station through the protocol layer device (e.g., MAC layer device) of the second plurality of bearers while performing data transmission and reception (uplink or downlink data transmission and reception) with the source base station through the protocol layer devices of the first plurality of bearers. In the above description, the random access procedure may include transmission of a preamble, reception of a random access response, or transmission of a message 3.

In the above description, it may be characterized that the UE completes a random access procedure to the target base station using the protocol layer device (e.g., MAC layer device) of the second plurality of bearers while performing data transmission and reception with the source base station using the protocol layer devices of the first plurality of bearers, and transmits a handover completion message to the target base station using the protocol layer devices of the second plurality of bearers.

In the above description, it may be characterized that the UE completes a random access procedure to the target base station using the protocol layer device (e.g., MAC layer device) of the second plurality of bearers while performing data transmission and reception with the source base station using the protocol layer devices of the first plurality of bearers, and transmits a handover completion message to the target base station using the protocol layer devices of the second plurality of bearers and performs data transmission and reception (uplink or downlink).

In the above description, when the UE completes the random access procedure to the target base station (e.g., when a random access response is received), when a handover completion message (e.g., RRCReconfiguration message) is transmitted to the target base station, or when data is transmitted to the target base station for the first time using a PUCCH or PUSCH uplink transmission resource, it may be characterized that the UE may stop to transmit and receive data to and from the source base station using the protocol layer devices of the first plurality of bearers.

In the above description, when the handover command message was received, it may also be characterized that the UE continues to transmit and receive data (uplink or downlink data transmission and reception) to and from the source base station using the protocol layer devices of the first plurality of bearers, and performs a random access procedure to the target base station using the protocol layer devices of the second plurality of bearers, and when a random access response was received, when a handover completion message was transmitted to the target base station, or when data was transmitted for the first time using a PUCCH or PUSCH uplink transmission resource, it may be characterized that the UE stops transmitting uplink data to the source base station using the protocol layer devices of the first plurality of bearers and transmits uplink data to the target base station only using the protocol layer devices of the second plurality of bearers, continue to receive downlink data from the source base station using the protocol layer devices of a first plurality of bearers, and continue to receive downlink data from the target base station using the protocol layer devices of a second plurality of bearers.

In the following description of the disclosure, efficient handover procedures without a data interruption time based on the above characteristics may be proposed.

FIG. 1 is a diagram illustrating a structure of an LTE system to which the disclosure can be applied.

Referring to FIG. 1, as illustrated, a radio access network of the LTE system may include evolved Node Bs (hereinafter, ENB, node B, or base station) 105, 110, 115, and 120, a mobility management entity (MME) 125, and a serving-gateway (S-GW) 130. A user equipment (hereinafter, referred to as a UE or terminal) 135 may access an external network through the ENBs 105 to 120 and the S-GW 130.

In FIG. 1, the ENBs 105 to 120 may correspond to an existing Node B of a UMTS system. The ENB may be connected to the UEs 135 through a radio channel and perform a more complex role than that of the existing Node B. In the LTE system, because all user traffic including real-time services such as a voice over IP (VoIP) through an Internet protocol is serviced through a shared channel, a device for collecting and scheduling status information such as a buffer status, an available transmission power status, and a channel status of UEs may be required, and the ENBs 105 to 120 may be in charge of this. One ENB may usually control multiple cells. For example, in order to implement a transmission rate of 100 Mbps, the LTE system may use, for example, orthogonal frequency division multiplexing (hereinafter, referred to as OFDM) as radio access technology in a bandwidth of 20 MHz. Further, the ENB may apply an adaptive modulation & coding (hereinafter, referred to as AMC) method that determines a modulation scheme and a channel coding rate according to the channel status of the UE. The S-GW 130 is a device that provides a data bearer, and may generate or remove a data bearer under the control of the MME 125. The MME is a device in charge of various control functions as well as a mobility management function for the UE, and may be connected to a plurality of base stations.

Figure 2:
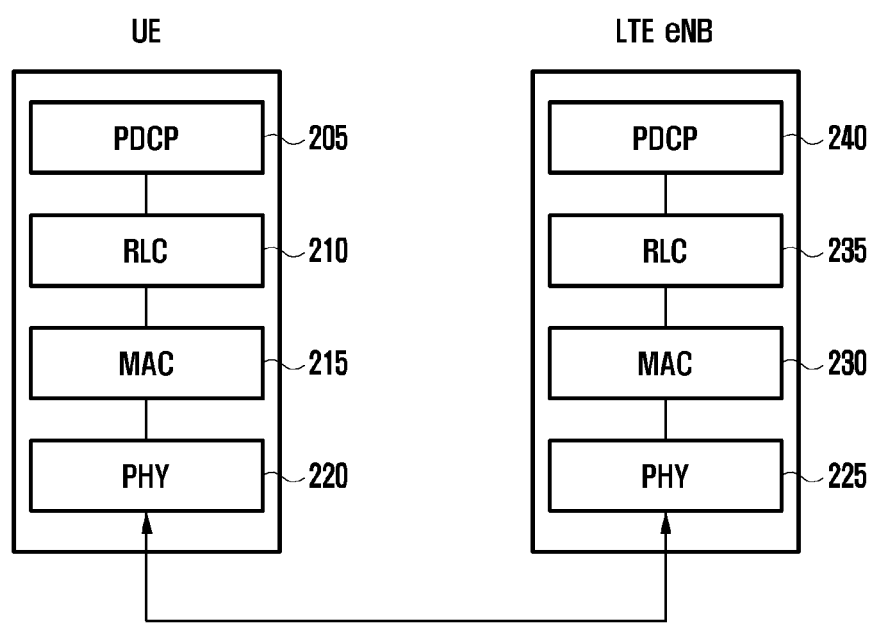
FIG. 2 is a block diagram illustrating a radio protocol structure in an LTE system to which the disclosure can be applied.

FIG. 2 is a block diagram illustrating a radio protocol structure in an LTE system to which the disclosure can be applied.

Referring to FIG. 2, a radio protocol of the LTE system may include packet data convergence protocols (PDCP) 205 and 240, radio link controls (RLC) 210 and 235, and medium access controls (MAC) 215 and 230 in the UE and ENB, respectively. The PDCPs 205 and 240 may be in charge of operations such as IP header compression/restoration. Main functions of the PDCP may be summarized as follows.

Header compression and decompression: ROHC only
    Transfer of user data
    In-sequence delivery of upper layer PDUs at PDCP re-establishment procedure for RLC AM For split bearers in DC (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The radio link controls (hereinafter, referred to as RLC) 210 and 235 may reconfigure a PDCP packet data unit (PDU) to an appropriate size to perform an ARQ operation and the like. Main functions of the RLC may be summarized as follows.

Transfer of upper layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 215 and 230 may be connected to several RLC layer devices configured in one UE, and perform an operation of multiplexing RLC PDUs to MAC PDUs and demultiplexing RLC PDUs from MAC PDUs. Main functions of the MAC may be summarized as follows.

Mapping between logical channels and transport channels

Multiplexing/demultiplexing of MAC SDUs belonging to one or different logical channels into/from transport blocks (TB) delivered to/from the physical layer on transport channel s Scheduling information reporting Error correction through HARQ Priority handling between logical channels of one UE Priority handling between UEs by means of dynamic scheduling MBMS service identification Transport format selection Padding The physical layers 220 and 225 may perform an operation of channel-coding and modulating upper layer data, making the upper layer data into an OFDM symbol and transmitting the OFDM symbol using a radio channel, or demodulating an OFDM symbol received through the radio channel and channel-deciphering the OFDM symbol and delivering the OFDM symbol to a higher layer.

Figure 3:
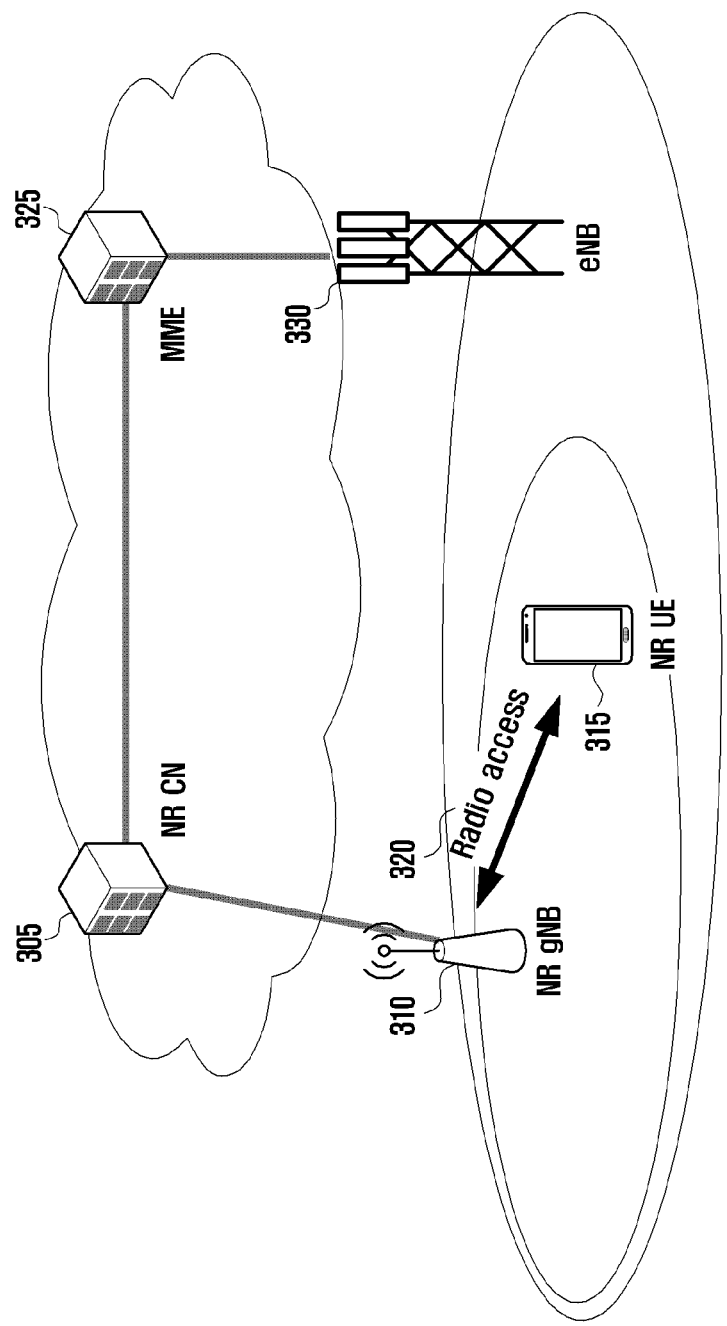
FIG. 3 is a diagram illustrating a structure of a next generation mobile communication system to which the disclosure can be applied.

FIG. 3 is a diagram illustrating a structure of a next generation mobile communication system to which the disclosure can be applied.

Referring to FIG. 3, as illustrated, a radio access network of the next generation mobile communication system (hereinafter, NR or 5 g) may include a new radio node B (hereinafter, NR gNB or NR base station) 310 and a new radio core network (NR CN) 305. A new radio user equipment (hereinafter, NR UE or terminal) 315 may access an external network through the NR gNB 310 and the NR CN 305.

In FIG. 3, the NR gNB 310 may correspond to an evolved node B (eNB) of the existing LTE system. The NR gNB may be connected to the NR UE 315 through a radio channel and provide a service superior to that of the existing Node B. In the next generation mobile communication system, because all user traffic is serviced through a shared channel, a device for collecting and scheduling status information such as a buffer status, an available transmission power status, and a channel status of UEs may be required, and the NR gNB 310 may be in charge of this. One NR gNB may generally control multiple cells. In order to implement ultrahigh speed data transmission compared to current LTE, the NR gNB may have a maximum bandwidth greater than the existing maximum bandwidth, and additional beamforming technology may be used by using orthogonal frequency division multiplexing (hereinafter, referred to as OFDM) as a radio access technology. Further, an adaptive modulation & coding (AMC) scheme that determines a modulation scheme and a channel coding rate according to a channel status of the UE may be applied. The NR CN 305 may perform functions such as mobility support, bearer configuration, QoS configuration, and the like. The NR CN is a device in charge of various control functions as well as a mobility management function for the UE, and may be connected to a plurality of base stations. Further, the next generation mobile communication system may be linked with the existing LTE system, and the NR CN may be connected to an MME 325 through a network interface. The MME may be connected to an eNB 330, which is the existing base station.

Figure 4:
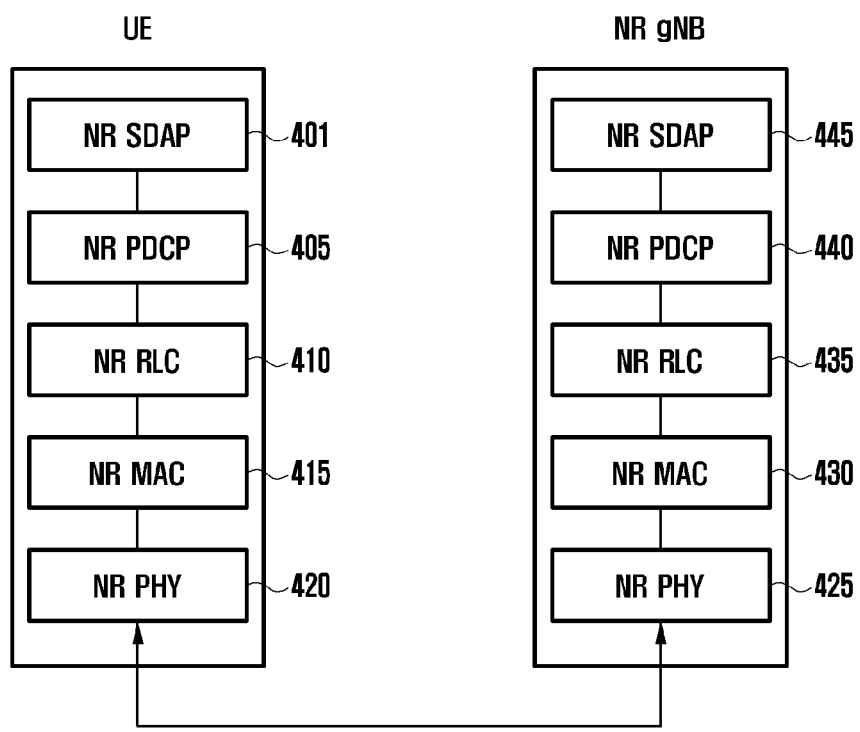
FIG. 4 is a block diagram illustrating a radio protocol structure of a next generation mobile communication system to which the disclosure can be applied.

FIG. 4 is a block diagram illustrating a radio protocol structure of a next generation mobile communication system to which the disclosure can be applied.

Referring to FIG. 4, radio protocols of the next generation mobile communication system may include NR service data adaptation protocols (SDAP) 401 and 445, NR PDCPs 405 and 440, NR RLCs 410 and 435, and NR MACs 415 and 430 in the UE and the NR base station, respectively.

Main functions of the NR SDAPs 401 and 445 may include some of the following functions.

Transfer of user plane data

Mapping between a QoS flow and a DRB for both DL and UL

Marking QoS flow ID in both DL and UL packets

Reflective QoS flow to DRB mapping for the UL SDAP PDUs.

For the SDAP layer device, the UE may receive a configuration on whether to use a header of the SDAP layer device for each PDCP layer device, for each bearer, or for each logical channel with a radio resource control (RRC) message, or whether to use a function of the SDAP layer device, and when the SDAP header is configured, the UE may instruct to update or reconfigure mapping information on uplink and downlink QoS flows and data bearers with a non-access stratum reflective quality of service (NAS reflective QoS) of the SDAP header, and an access stratum reflective QoS (AS reflective QoS). The SDAP header may include QoS flow ID information indicating a QoS. The QoS information may be used as data processing priority, scheduling information, and the like in order to support a smooth service.

Main functions of the NR PDCPs 405 and 440 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

In the above description, reordering of the NR PDCP device may refer to a function of reordering PDCP PDUs received from a lower layer in order based on a PDCP sequence number (SN) and may include a function of delivering data to a higher layer in the reordered order or a function of directly delivering data without considering the order, a function of recording lost PDCP PDUs by reordering the order, a function of reporting a status on the lost PDCP PDUs to the transmitting side, and a function of requesting retransmission of the lost PDCP PDUs.

Main functions of the NR RLCs 410 and 435 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above description, in-sequence delivery of the NR RLC device may refer to a function of delivering RLC SDUs received from a lower layer in order to a higher layer, and when one RLC SDU is originally divided into several RLC SDUs and received, the in-sequence delivery of the NR RLC device may include a function of reassembling and delivering several RLC SDUs, a function of reordering the received RLC PDUs based on an RLC sequence number (SN) or PDCP SN (sequence number), a function of recording the lost RLC PDUs by reordering the order, a function of reporting a status on the lost RLC PDUs to the transmitting side, a function of requesting retransmission of the lost RLC PDUs, and a function of delivering only RLC SDUs before the lost RLC SDU in order to the upper layer when there is a lost RLC SDU, a function of delivering all received RLC SDUs in order to the upper layer before the start of a timer when a predetermined timer has expired, even if there is a lost RLC SDU, or a function of delivering all RLC SDUs received so far in order to the upper layer when a predetermined timer has expired, even if there is a lost RLC SDU. Further, the RLC PDUs may be processed in order in which they are received (in the order of arrival regardless of the sequence number and the order of the sequence number) to be delivered to the PDCP device with out-of sequence delivery, and segments may be stored in the buffer or segments to be received later may be received, be reconfigured into one complete RLC PDU, be processed, and delivered to the PDCP device. The NR RLC layer may not include a concatenation function, and the concatenation function may be performed in the NR MAC layer or may be replaced with a multiplexing function of the NR MAC layer.

In the above description, out-of-sequence delivery of the NR RLC device may refer to a function of directly delivering RLC SDUs received from a lower layer to a higher layer regardless of the order, and when one RLC SDU is originally divided into several RLC SDUs and received, out-of-sequence delivery of the NR RLC device may include a function of reassembling and delivering several RLC SDUs, and a function of storing the RLC SN or PDCP SN of the received RLC PDUs, ordering the order thereof, and recording the lost RLC PDUs.

The NR MACs 415 and 430 may be connected to several NR RLC layer devices configured in one UE, and main functions of the NR MAC may include some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layers 420 and 425 may perform an operation of channel-coding and modulating upper layer data, making the upper layer data into an OFDM symbol and transmitting the OFDM symbol using the radio channel, or demodulating and channel-deciphering the OFDM symbol received through the radio channel to deliver the OFDM symbol to the upper layer.

Figure 5:
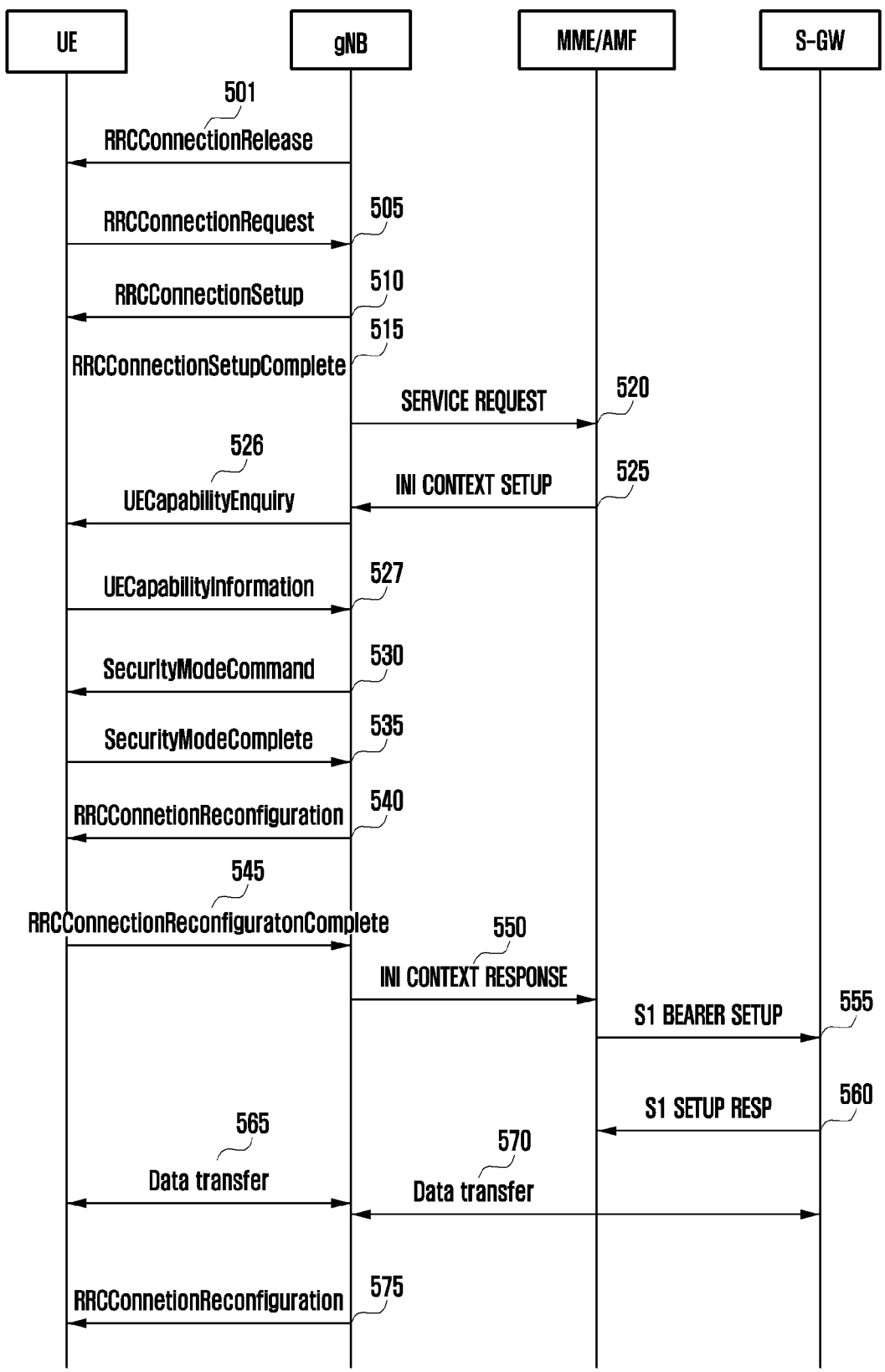
FIG. 5 is a message flow diagram illustrating a procedure in which a UE switches from an RRC idle mode to an RRC connected mode to establish a connection with a network in the disclosure.

FIG. 5 is a message flow diagram illustrating a procedure in which a UE switches from an RRC idle mode to an RRC connected mode to establish a connection with a network in the disclosure.

In FIG. 5, the base station may transmit an RRCConnectionRelease message to the UE when the UE that transmits and receives data in the RRC connected mode does not transmit or receive data for a predetermined reason or for a certain period of time to switch a mode of the UE to the RRC idle mode (501). In the future, a UE in which connection is not currently established (hereinafter, idle mode UE) may perform an RRC connection establishment process with the base station when data to be transmitted occurs. The UE establishes reverse transmission synchronization with the base station through a random access process and transmits an RRCConnectionRequest message to the base station (505). The message may include an identifier of the UE and a reason for establishing a connection (establishmentCause). The base station transmits an RRCConnectionSetup message so that the UE establishes RRC connection (510).

The message may include configuration information for each service/bearer/each RLC device, for each logical channel, or for each bearer, whether to use robust header compression (ROHC) for each bearer/logical channel, and ROHC configuration information (e.g., ROHC version, initial information, etc.), statusReportRequired information (information that the base station instructs a PDCP status report to the UE), and drb-ContinueROHC information (configuration information to maintain and use the ROHC configuration information as it is) may be included in PDCP layer device configuration information (pdcp-config) and transmitted. Further, the message may include RRC connection configuration information and the like. The bearer for RRC connection is also referred to as a signaling radio bearer (SRB), and may be used for transmitting and receiving RRC messages, which are control messages between the UE and the base station.

The UE that has established the RRC connection transmits an RRCConnetionSetupComplete message to the base station (515). The message includes a control message called SERVICE REQUEST in which the UE requests an MME to establish a bearer for a predetermined service. The base station transmits a SERVICE REQUEST message included in the RRCConnetionSetupComplete message to the MME or an access and mobility management function (AMF) (520), and the MME or the AMF may determine whether to provide a service requested by the UE. As a result of the determination, when the UE determines to provide the requested service, the MME or the AMF transmits an INITIAL CONTEXT SETUP REQUEST message to the base station (525). The message may include information such as quality of service (QoS) information to be applied when configuring a data radio bearer (DRB), and security related information (e.g., security key, security algorithm) to be applied to the DRB.

Further, when the base station does not receive capability information of the UE from the MME or the AMF, in order to check the capability information of the UE, the base station may transmit a UE capability information request message to the UE (526). Upon receiving the UE capability information request message, the UE may configure and generate a UE capability information message and report the UE capability information message to the base station (527). The UE capability information message may include what types of handover methods the UE supports. When the base station checks the UE capability information, the base station may instruct the UE by defining an indicator for each handover method as to which handover is instructed in the handover command message when instructing handover to the UE. The UE may perform a handover procedure to the target base station according to the handover method instructed in the handover command message.

In order to establish security with the UE, the base station may exchange a SecurityModeCommand message 530 and a SecurityModeComplete message 535. When security establishment is completed, the base station transmits an RRCConnectionReconfiguration message to the UE (540).

The message includes configuration information for each service/bearer/each RLC device, for each logical channel, or for each bearer, and whether to use a ROHC for each bearer/logical channel, ROHC configuration information (e.g., ROHC version, initial information, etc.), statusReportRequired information (information that the base station instructs the UE to report a PDCP status), and drb-ContinueROHC information (configuration information to maintain and use the ROHC configuration information as it is) may be included in PDCP layer device configuration information (pdcp-config) and transmitted. Further, the message may include RRC connection configuration information and the like. The bearer for RRC connection is also referred to as a signaling radio bearer (SRB), and may be used for transmitting and receiving RRC messages, which are control messages between the UE and the base station.

Further, the message includes configuration information of a DRB in which user data is to be processed, and the UE configures the DRB by applying the information, and transmits an RRCConnectionReconfigurationComplete message to the base station (545). The base station that has completed a DRB configuration with the UE transmits an INITIAL CONTEXT SETUP COMPLETE message to the MME or AMF (550), and the MME or AMF that has received the INITIAL CONTEXT SETUP COMPLETE message exchanges an S1 BEARER SETUP message and an S1 BEARER SETUP RESPONSE message in order to configure the S1 bearer with the S-GW. (555, 560). The S1 bearer is data transmission connection established between the S-GW and the base station, and may correspond to the DRB in a one-to-one manner. When all the above processes are completed, the UE transmits and receives data to and from the base station through the S-GW (565, 570). In this way, a general data transmission process may be largely configured with three steps of an RRC connection configuration, a security configuration, and a DRB configuration. Further, in order to reconfigure, add, or change a configuration to the UE for a predetermined reason, the base station may transmit an RRC Connection Reconfiguration message to the UE (575).

In the disclosure, the bearer may include an SRB and a DRB. The SRB stands for a signaling radio bearer, and the DRB stands for a data radio bearer. The SRB is mainly used for transmitting and receiving RRC messages of the RRC layer device, and the DRB may be mainly used for transmitting and receiving user layer data. An UM DRB means a DRB using an RLC layer device operating in an unacknowledged mode (UM) mode, and an AM DRB means a DRB using an RLC layer device operating in an acknowledged mode (AM).

Figure 6:
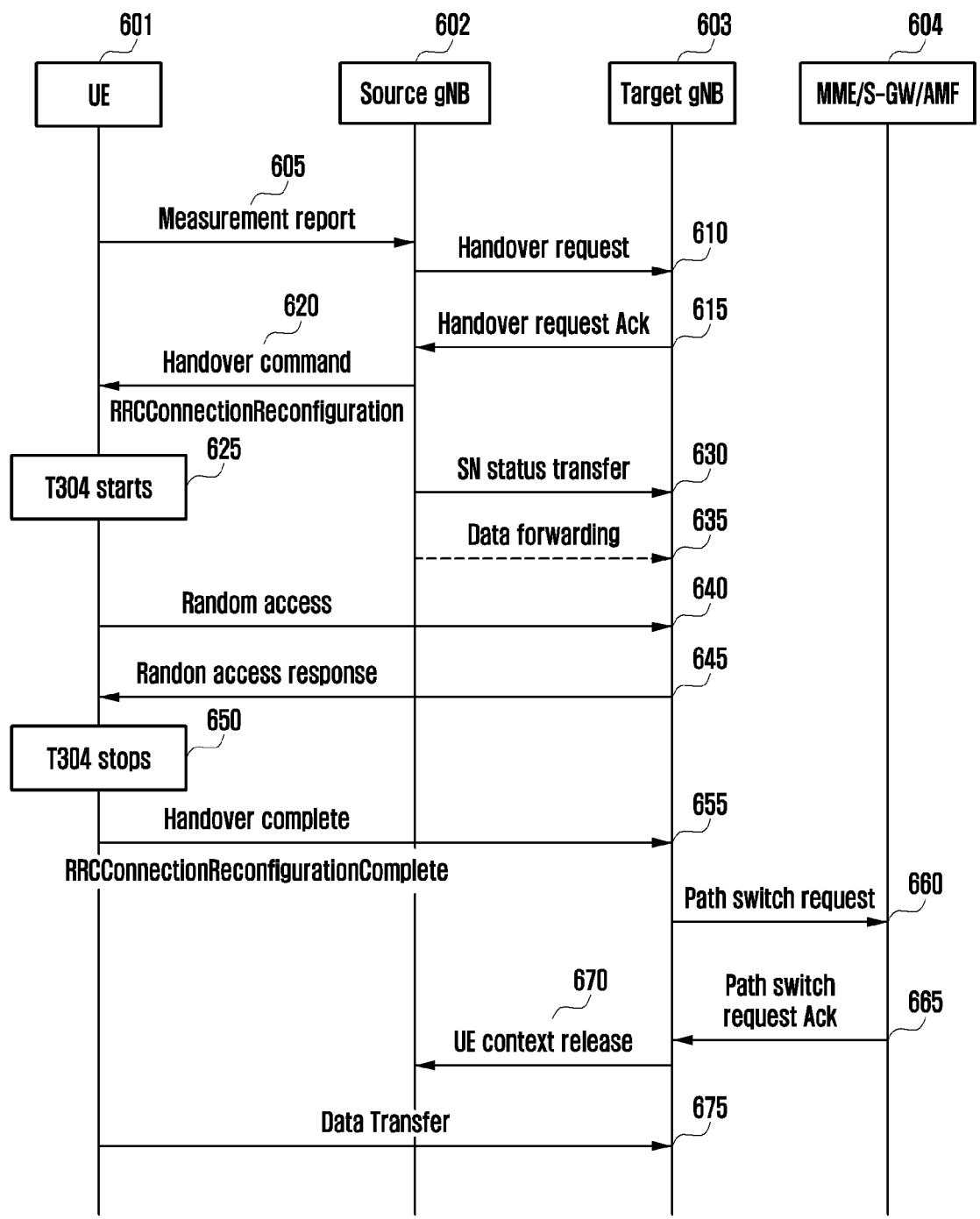
FIG. 6 is a message flow diagram illustrating signaling procedures for performing handover in a next generation mobile communication system.

FIG. 6 is a message flow diagram illustrating signaling procedures for performing handover in a next generation mobile communication system.

A UE 601 in an RRC connected mode reports cell measurement information (measurement report) to a source base station (source eNB) 602 periodically or when a specific event is satisfied (605). The source base station may determine whether the UE is to perform handover to a neighboring cell based on the measurement information. Handover is technology for changing a source base station providing a service to a UE in a connected mode to another base station (or another cell of the same base station). When the source base station determines handover, the source base station sends a handover (HO) request message to a new base station, that is, a target base station (target eNB) 603 that will provide a service to the UE to request handover (610). When the target base station accepts the handover request, the target base station transmits a HO request Ack message to the source base station (615). The source base station that has received the message, transmits a handover command message (HO command message) to the UE (620). The HO command message is transmitted from the source base station to the UE using an RRC Connection Reconfiguration message (620). Upon receiving the message, the UE may stop transmitting and receiving data to and from the source base station and start a T304 timer. When the UE does not succeed in handover to the target base station for a predetermined period of time, the T304 timer may return the UE to an original configuration and switch a status of the UE to the RRC idle status. The source base station transmits a sequence number (SN) status for uplink/downlink data, and when there is downlink data, the source base station transmits the downlink data to the target base station (630, 635). The UE attempts random access to a target cell indicated by the source base station (640). The random access is for notifying the target cell that the UE is moving through handover and at the same time synchronizing uplink. For the random access, the UE may transmit a preamble ID provided from the source base station or a preamble corresponding to a randomly selected preamble ID to the target cell. After the preamble is transmitted, a specific number of subframes have elapsed and then the UE may monitor whether a random access response message (RAR) is transmitted from the target cell. The monitoring time period may be referred to as a random access response window (RAR window). During the specified time, when a random access response (RAR) is received (645), the UE transmits a handover complete (HO complete) message as an RRC reconfiguration complete message to the target base station (655). As described above, when the random access response is successfully received from the target base station, the UE stops the T304 timer (650). In order to switch paths of bearers set to the source base station, the target base station requests path switch (660, 665), and notifies the source base station to release the UE context of the UE (670). Accordingly, the UE attempts to receive data from the target base station from a start point of the RAR window, and after the RAR is received, the UE may start to transmit and receive data to and from the target base station while transmitting an RRC reconfiguration complete message.

The disclosure may propose handover methods without interruption capable of minimizing or reducing a data interruption time due to handover to 0 ms in a next generation mobile communication system.

The UE may establish a first plurality of bearers with the source base station and transmit and receive data (uplink or downlink data transmission and reception) through each protocol layer device (PHY layer device, MAC layer device, RLC layer device, or PDCP layer device) of each bearer, but in the following description of the disclosure, for convenience of description, it may be described as if the UE has one bearer in the drawings and description.

Figure 7:
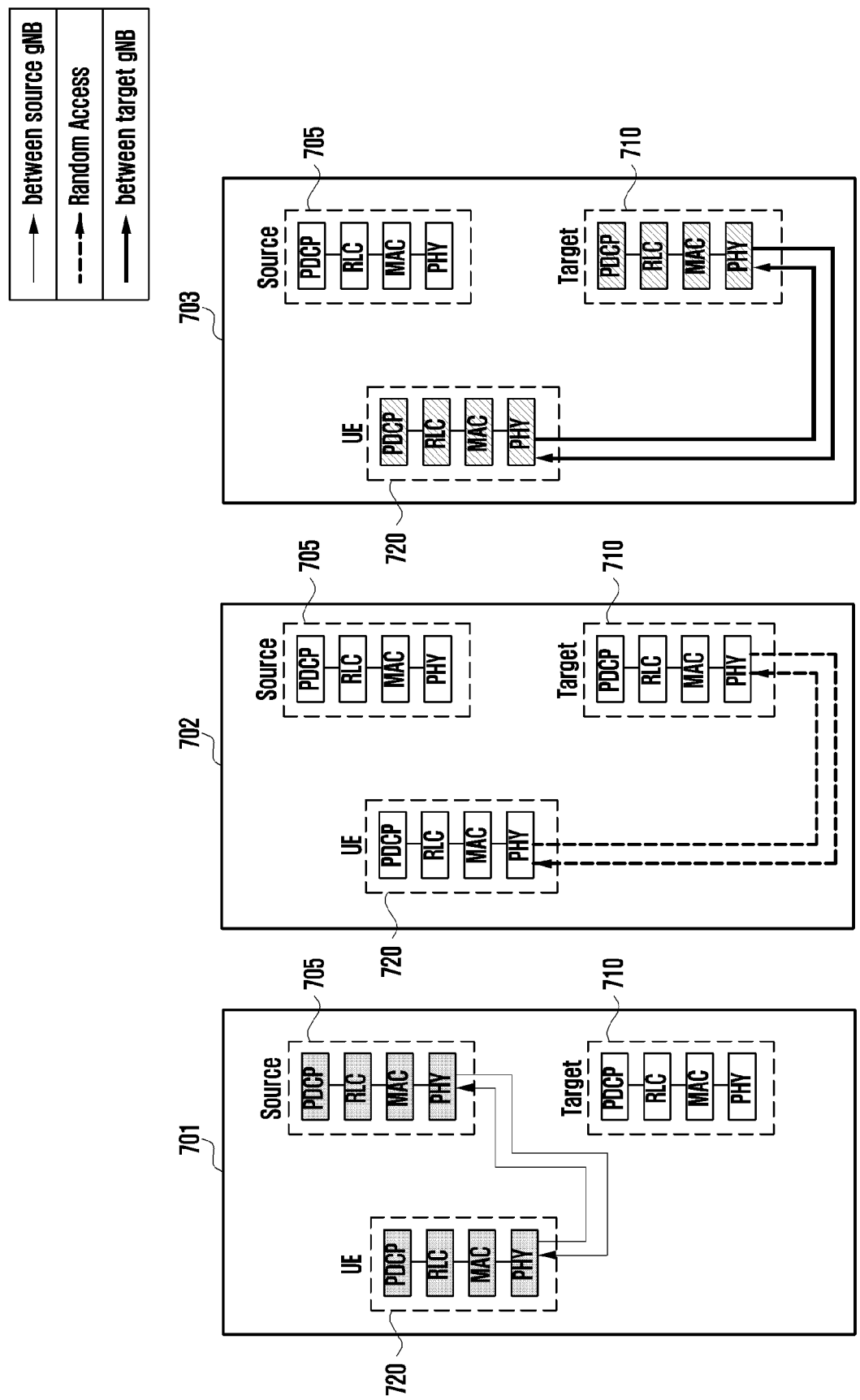
FIG. 7 is a diagram illustrating specific steps of a first embodiment of an efficient handover method for minimizing a data interruption time due to handover in the disclosure.

FIG. 7 is a diagram illustrating specific steps of a first embodiment of an efficient handover method for minimizing a data interruption time due to handover in the disclosure.

In the first embodiment of the efficient handover method of FIG. 7, while a UE 720 transmits and receives data to and from a source base station 705 in first step 701, even if the UE 720 receives a handover command from the source base station, in order to minimize a data interruption time generated during handover, it may be characterized that the UE 720 may continue to transmit and receive data to and from the source base station.

In the first embodiment of the efficient handover method of FIG. 7, when the UE 720 performs a random access procedure to a target base station 710 instructed in the handover command message in second step 702, when the UE 720 transmits a preamble, or when the UE 720 transmits data with an uplink transmission resource for the first time using a PUCCH or PUSCH transmission resource, it may be characterized that the UE 720 stops data transmission and reception (uplink data transmission and downlink data reception) with the source base station.

In the first embodiment of the efficient handover method of FIG. 7, it may be characterized that the UE 720 completes the random access procedure to the target base station in third step 703, transmits a handover completion message, and starts data transmission and reception with the target base station (uplink data transmission and downlink data reception).

Figure 8:
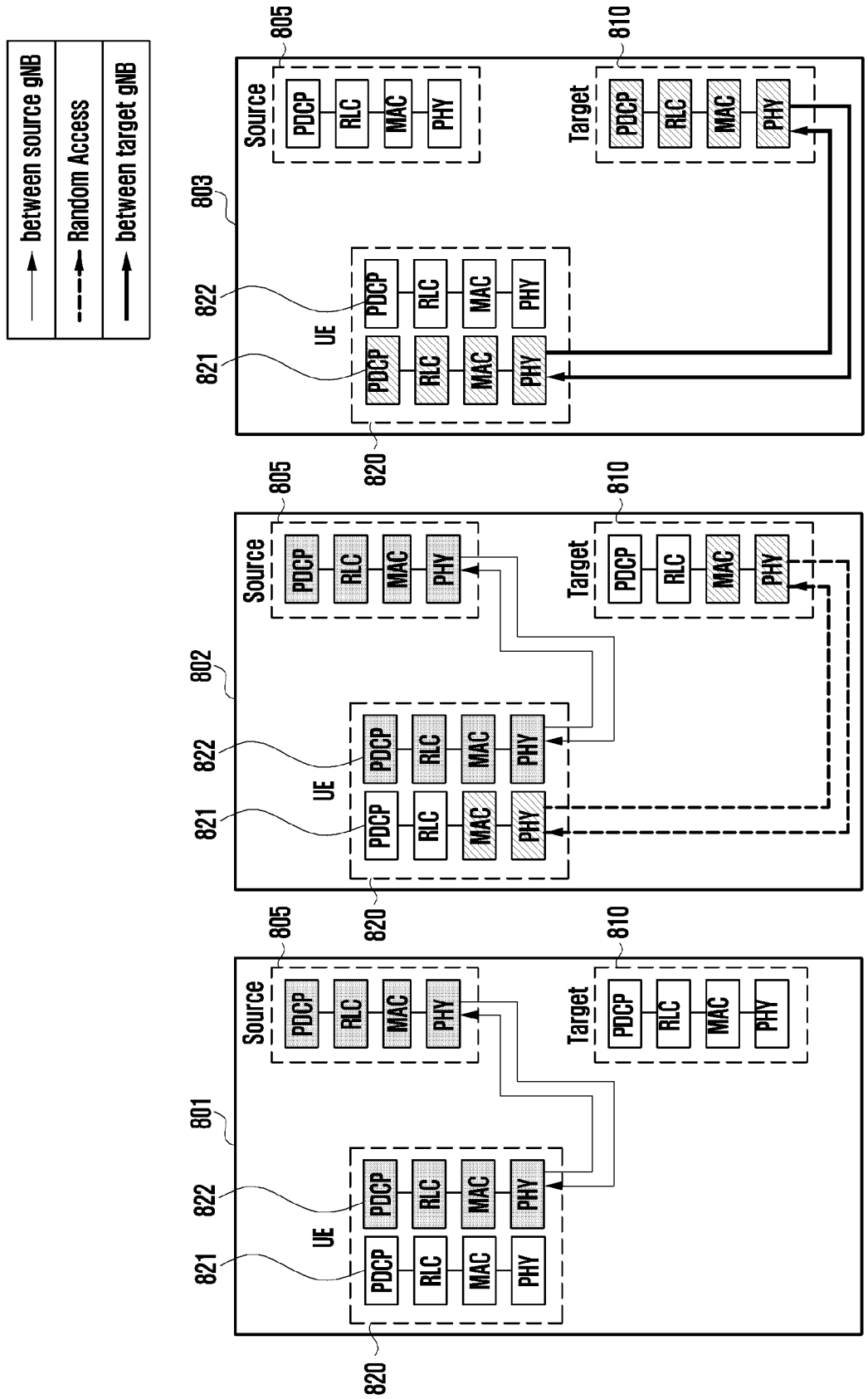
FIG. 8 is a diagram illustrating specific steps of a second embodiment and third embodiment of an efficient handover method for minimizing a data interruption time due to handover in the disclosure.

FIG. 8 illustrates specific steps of a second embodiment and third embodiment of an efficient handover method for minimizing a data interruption time due to handover in the disclosure.

In the second embodiment of the efficient handover method of FIG. 8, while a UE 820 transmits and receives data to and from a source base station 805 in first step 801, even if the UE 820 receives a handover command from the source base station, in order to minimize a data interruption time generated during handover, it may be characterized that the UE 820 may continue to transmit and receive data to and from the source base station through the protocol layer devices 822 of the first bearer. Further, it may be characterized that the UE 820 may preconfigure or establish protocol layer devices (PHY layer device, MAC layer device, RLC layer device, or PDCP layer device) 821 of the second bearer for the target base station according to a configuration included in the received handover command message. It may be characterized that the second bearer may be configured and established to have the same bearer identifier as that of the first bearer so that a data interruption time does not occur for each bearer. Further, even if the UE receives a handover command message from the source base station, it may be characterized that the UE does not reset the MAC layer device of the first bearer in order to prevent data loss by continuing data transmission and reception due to HARQ retransmission.

In the second embodiment of the efficient handover method of FIG. 8, even when the UE 820 performs a random access procedure (e.g., before the UE 820 transmits a preamble and receives a random access response) to a target base station 810 instructed in the handover command message through protocol layer devices of the second bearer in second step 802, it may be characterized that the UE 820 may continue to transmit and receive data to and from the source base station through the protocol layer devices of the first bearer (uplink data transmission and downlink data reception).

In the second embodiment of the efficient handover method of FIG. 8, it may be characterized that the UE 820 completes the random access procedure to the target base station 810 using the protocol layer devices of the second bearer in third step 803 and performs data transmission and reception (downlink data reception and uplink data transmission). When a first condition is satisfied, it may be characterized that the UE may stop transmitting and receiving data to and from the source base station 805 through protocol layer devices 822 of the first bearer. In the above description, the first condition may be one of the following conditions. Further, a PDCP layer device 821 of the second bearer may continue to perform data transmission and reception to and from the target base station using information such as transmission and reception data, serial number information and perform data transmission and reception without interruption with the target base station using information such as transmission and reception data, serial number information, or header compression and decompression context stored in the PDCP layer device 822 of the first bearer.

When the UE performs a random access procedure to the target base station through the layer devices 821 of the second bearer and receives a random access response, When the UE performs a random access procedure to the target base station through the layer devices of the second bearer, receives a random access response, and configures and transmits a handover completion message to the target base station, When the UE completes the random access procedure to the target base station through the layer devices of the second bearer and transmits data for the first time with a PUCCH or PUSCH uplink transmission resource, When the base station sets a separate timer to the UE with an RRC message and the timer has expired, When the UE receives a handover command message from the source base station, starts random access to the target base station (when the UE transmits a preamble), receives a random access response from the target base station, transmits a handover completion message to the target base station, or transmits data for the first time with a PUCCH or PUSCH uplink transmission resource, the timer may be started.

In the third embodiment of the efficient handover method of FIG. 8, while the UE 820 transmits and receives data to and from the source base station 805 in first step 801, even if the UE 820 receives a handover command from the source base station, in order to minimize a data interruption time generated during handover, it may be characterized that the UE 820 may continue to transmit and receive data to and from the source base station through the protocol layer devices 822 of the first bearer. Further, it may be characterized that the UE 820 may preconfigure or establish protocol layer devices (PHY layer device, MAC layer device, RLC layer device, or PDCP layer device) 821 of the second bearer for the target base station according to a configuration included in the received handover command message. It may be characterized that the second bearer may be configured and established to have the same bearer identifier as that of the first bearer so that a data interruption time does not occur for each bearer. Further, in the handover command message, in order for the UE to omit a random access procedure to the target base station through the protocol layer devices of the second bearer, the handover command message may include the uplink transmission resource for the target base station and be transmitted to the UE. As another method, when the handover command message instructs handover without a random access procedure, it may be characterized that the UE synchronizes with the target base station without a random access procedure and monitors a PDCCH from the target base station to receive an uplink transmission resource. By omitting the random access procedure in this way, a data interruption time may be minimized. Further, even if the UE receives the handover command message from the source base station, it may be characterized that in order to prevent data loss by continuing data transmission and reception due to HARQ retransmission, the UE does not reset the MAC layer device of the first bearer.

In the third embodiment of the efficient handover method of FIG. 8, it may be characterized that the UE 820 may omit to perform the random access procedure to the target base station 810 instructed in the handover command message through the protocol layer devices of the second bearer in second step 802. The UE may configure and transmit a handover completion message to the target base station through the protocol layer devices of the second bearer using the transmission resource of the target base station instructed in the handover command message. As another method, although the handover command message instructed handover without a random access procedure, when an uplink transmission resources to the target base station is not included, if the UE synchronizes with the target base station without the random access procedure and monitors the PDCCH from the target base station to receive an uplink transmission resource, the UE may transmit the handover completion message to the target base station. In the above description, it may be characterized that the UE may continue data transmission and reception (uplink data transmission and downlink data reception) with the source base station through the protocol layer devices of the first bearer.

In the third embodiment of the efficient handover method of FIG. 8, it may be characterized that the UE 820 omits a random access procedure to the target base station 810 using the protocol layer devices of the second bearer in third step 803 and performs data transmission and reception (downlink data reception and uplink data transmission). When a first condition is satisfied, it may be characterized that the UE may stop transmitting and receiving data to and from the source base station 805 through the protocol layer devices 822 of the first bearer. In the above description, the first condition may be one of the following conditions. Further, the PDCP layer device 821 of the second bearer may continue to perform data transmission and reception without interruption with the target base station using information such as transmission and reception data, serial number information, or header compression and decompression context stored in the PDCP layer device 822 of the first bearer.

When the UE performs a random access procedure to the target base station through the layer devices of the second bearer, receives a random access response, and configures and transmits a handover completion message to the target base station, When the UE completes the random access procedure to the target base station through the layer devices of the second bearer and transmits data for the first time with a PUCCH or PUSCH uplink transmission resource, When the base station sets a separate timer to the UE with an RRC message and the timer has expired, When the UE receives a handover command message from the source base station, starts random access to the target base station (when the UE transmits a preamble), receives a random access response from the target base station, transmits a handover completion message to the target base station, or transmits data for the first time with a PUCCH or PUSCH uplink transmission resource, the timer may be started.

Figure 9:
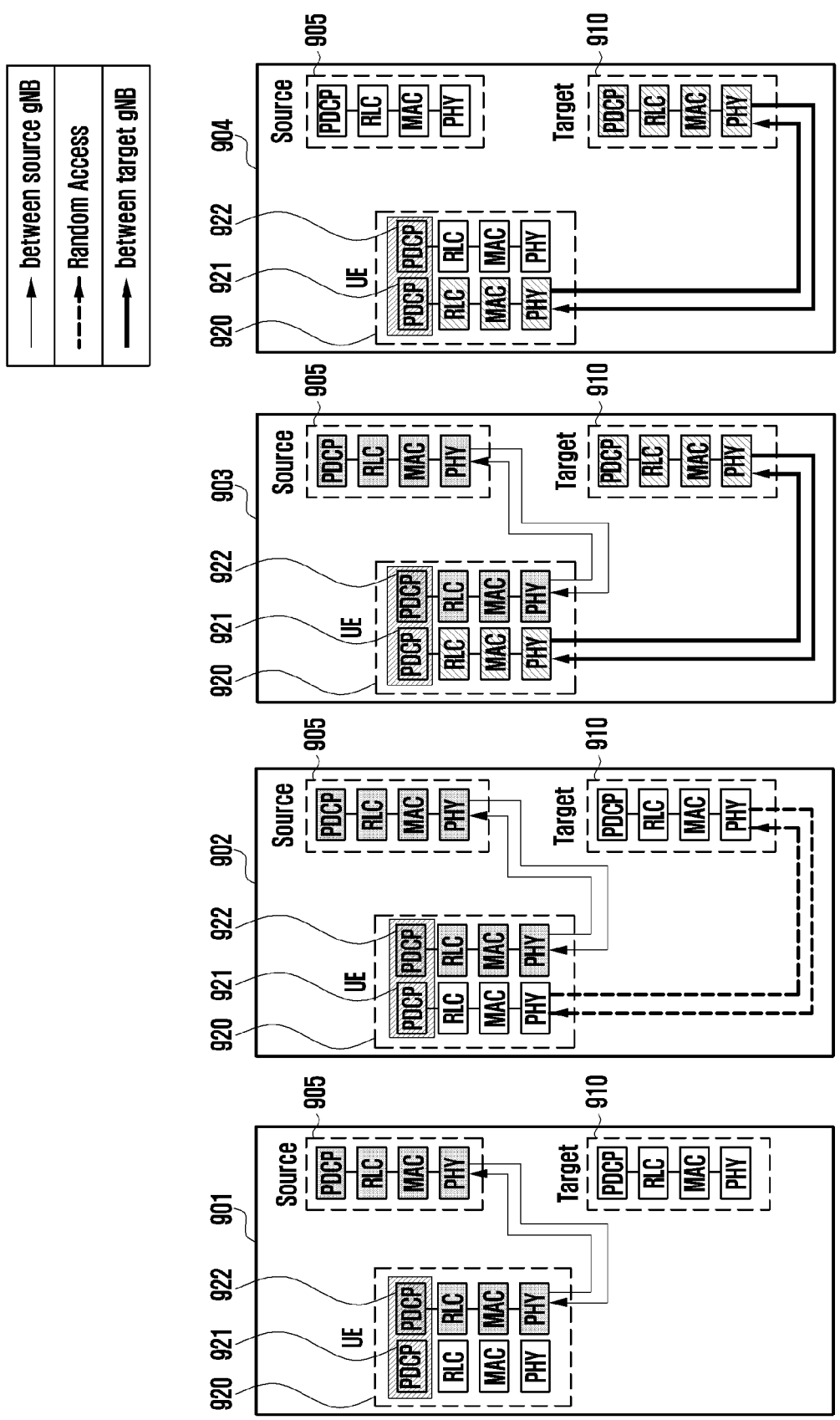
FIG. 9 is a diagram illustrating specific steps of a fourth embodiment of an efficient handover method for minimizing a data interruption time due to handover in the disclosure.

FIG. 9 illustrates specific steps of a fourth embodiment of an efficient handover method for minimizing a data interruption time due to handover in the disclosure.

In the fourth embodiment of the efficient handover method of FIG. 9, while a UE 920 transmits and receives data to and from a source base station 905 in first step 901, even if the UE 920 receives a handover command from the source base station, in order to minimize a data interruption time generated during handover, it may be characterized that the UE 920 may continue to transmit and receive data to and from the source base station through protocol layer devices 922 of the first bearer. Further, it may be characterized that protocol layer devices (PHY layer device, MAC layer device, RLC layer device, or PDCP layer device) 921 of the second bearer for the target base station may be preconfigure or established according to a configuration included in the received handover command message. It may be characterized that the second bearer may be configured and established to have the same bearer identifier as that of the first bearer so that a data interruption time does not occur for each bearer. Further, in the fourth embodiment, it may be characterized that the PDCP layer device of the first bearer and the PDCP layer device of the second bearer logically operate as one PDCP layer device, and a more specific operation method may be described in FIG. 11. Further, in the fourth embodiment, when the UE may transmit all uplink data to the source base station and the target base station, in order to prevent a problem of coverage reduction due to lack of transmission power of the UE or a problem (link selection) of determining whether to request a transmission resource to which base station when transmitting uplink data and to transmit uplink data, in the fourth embodiment, when the UE transmits uplink data to the source base station or the target base station, it may be characterized that the UE may transmit uplink data to the source base station or the target base station at different times through a time domain multiplexing (TDM) method at different times. As another method, when the base station sets a threshold value with an RRC message, if a size of uplink data of the UE is smaller than the threshold, it may be characterized that the UE may transmit the uplink data to the source base station (or target base station), and if a size of uplink data of the UE is greater than the threshold, it may be characterized that the UE may transmit all uplink data to the source base station and the target base station. The uplink data transmission may include a scheduling request procedure or a buffer status report procedure for reporting the size of data to be transmitted. Further, even if the UE receives the handover command message from the source base station, it may be characterized that in order to prevent data loss by continuing data transmission and reception due to HARQ retransmission, the UE does not reset the MAC layer device of the first bearer.

In the fourth embodiment of the efficient handover method of FIG. 9, even when the UE 920 performs a random access procedure to a target base station 910 instructed in the handover command message through protocol layer devices of the second bearer in second step 902, it may be characterized that the UE may continue data transmission and reception (uplink data transmission and downlink data reception) with the source base station through the protocol layer devices of the first bearer.

In the fourth embodiment of the efficient handover method of FIG. 9, it may be characterized that the UE 920 may complete the random access procedure to the target base station 910 using the protocol layer devices of the second bearer in third step 903, perform data transmission and reception (downlink data reception and uplink data transmission), and continue data transmission and reception (uplink data transmission and downlink data reception) with the source base station through the protocol layer devices of the first bearer.

In the fourth embodiment of the efficient handover method of FIG. 9, when the first condition is satisfied in fourth step 904, it may be characterized that the UE 920 stops data transmission and reception with the source base station 905 through the protocol layer devices 922 of the first bearer. In the above description, the first condition may be one of the following conditions. Further, the PDCP layer device 921 of the second bearer may continue to perform data transmission and reception without interruption with the target base station using information such as transmission and reception data, serial number information, or header compression and decompression context stored in the PDCP layer device 922 of the first bearer.

- When the UE performs a random access procedure to the target base station through the layer devices 921 of the second bearer and receives a random access response,
- When the UE performs a random access procedure to the target base station through the layer devices of the second bearer, receives a random access response, and configures and transmits a handover completion message to the target base station,
- When the UE completes the random access procedure to the target base station through the layer devices of the second bearer and transmits data for the first time with a PUCCH or PUSCH uplink transmission resource,
- When the base station sets a separate timer to the UE with an RRC message and the timer has expired,
- When the UE receives a handover command message from the source base station, starts random access to the target base station (when the UE transmits a preamble), receives a random access response from the target base station, transmits a handover completion message to the target base station, or transmits data for the first time with a PUCCH or PUSCH uplink transmission resource, the timer may be started.

Figure 10:
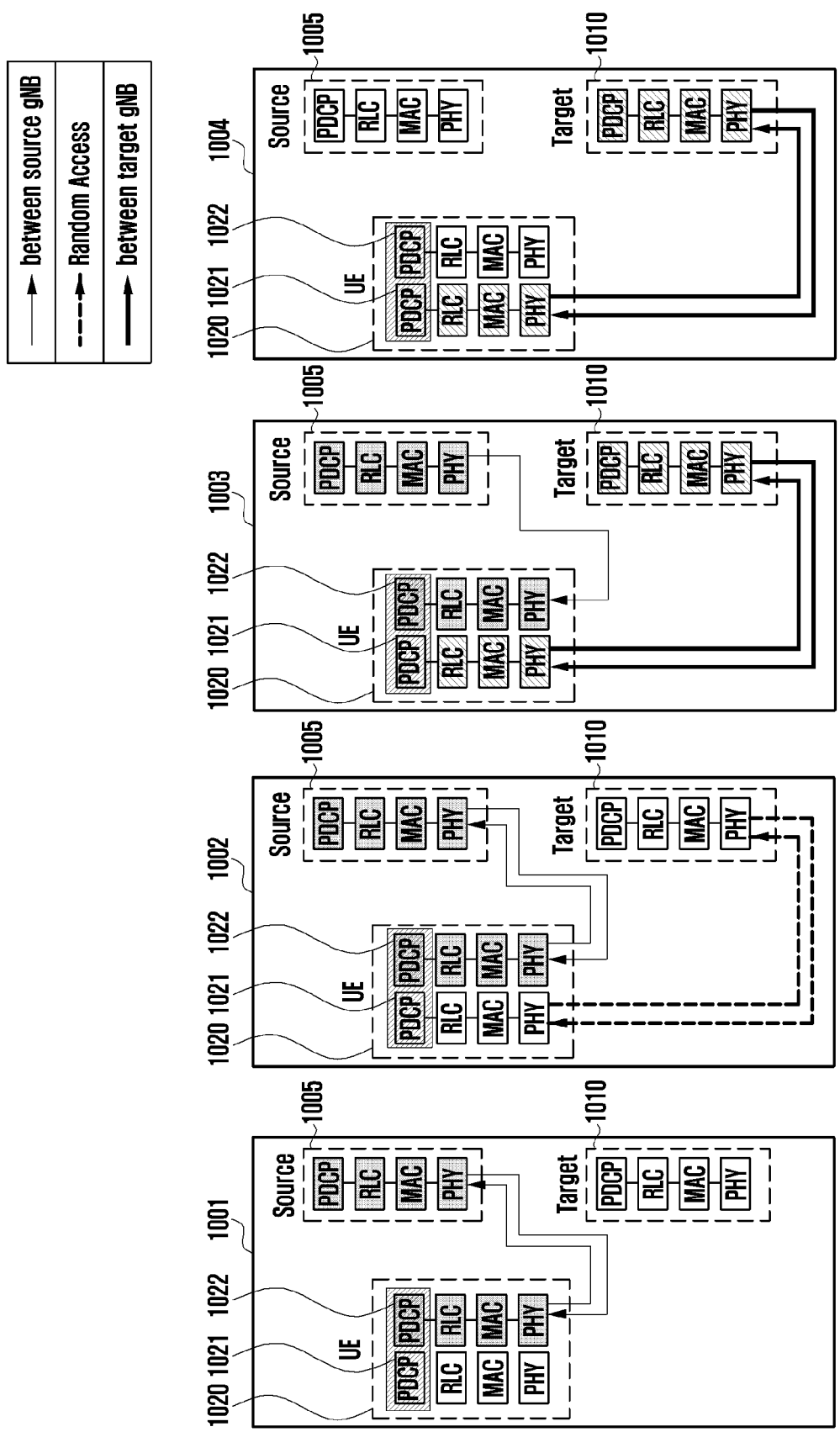
FIG. 10 is a diagram illustrating specific steps of a fifth embodiment of an efficient handover method for minimizing a data interruption time due to handover in the disclosure.

FIG. 10 illustrates specific steps of a fifth embodiment of an efficient handover method for minimizing a data interruption time due to handover in the disclosure.

In the fifth embodiment of the efficient handover method of FIG. 10, while a UE 1020 transmits and receives data to and from a source base station 1005 in first step 1001, even if the UE 1020 receives a handover command from the source base station, in order to minimize a data interruption time generated during handover, it may be characterized that the UE 1020 may continue to transmit and receive data to and from the source base station through protocol layer devices 1022 of the first bearer. Further, it may be characterized that protocol layer devices (PHY layer device, MAC layer device, RLC layer device, or PDCP layer device) 1021 of the second bearer for the target base station may be preconfigured and established according to a configuration included in the received handover command message. It may be characterized that the second bearer may be configured and established to have the same bearer identifier as that of the first bearer so that a data interruption time does not occur for each bearer. Further, in the fifth embodiment, it may be characterized that the PDCP layer device of the first bearer and the PDCP layer device of the second bearer logically operate as one PDCP layer device, and a more specific operation method may be described in the FIG. 11. Further, in the fifth embodiment, when the UE may transmit all uplink data to the source base station and the target base station, in order to prevent a problem of coverage reduction due to lack of transmission power of the UE or a problem (link selection) of determining whether to request a transmission resource to which base station when transmitting uplink data and to transmit uplink data, in the fifth embodiment, it may be characterized that uplink data may be transmitted to only one of the source base station and the target base station. Therefore, it may be characterized that the UE may perform a scheduling request to only one base station of the source base station and the target base station, transmit reports (e.g., buffer status report) on a size of data to be transmitted from the PDCP layer device to only one base station of the source base station and the target base station, receive an uplink transmission resource, and transmit uplink data to only one base station. Further, even if the UE receives a handover command message from the source base station, it may be characterized that in order to prevent data loss by continuing data transmission and reception due to HARQ retransmission, the UE does not reset the MAC layer device of the first bearer.

In the fifth embodiment of the efficient handover method of FIG. 10, even when the UE 1020 performs a random access procedure to a target base station 1010 instructed in the handover command message through the protocol layer devices of the second bearer in second step 1002, it may be characterized that the UE may continue data transmission and reception (uplink data transmission and downlink data reception) with the source base station through the protocol layer devices of the first bearer.

In the fifth embodiment of the efficient handover method of FIG. 10, in third step 1003, when the second condition is satisfied, it may be characterized that the UE 1020 stops transmitting uplink data to the source base station through the protocol layer devices 1022 of the first bearer, and transmits the uplink data to the target base station through the protocol layer devices 1021 of the second bearer, and it may be characterized that downlink data may be continuously received from the source base station and the target base station through the protocol layer devices 1021 of the first bearer and the second bearer. In the above description, the second condition may be one of the following conditions. Further, the PDCP layer device 1021 of the second bearer may continue to perform data transmission and reception without interruption with the target base station using information such as transmission and reception data, serial number information, or header compression and decompression context stored in the PDCP layer device 1022 of the first bearer.

When the UE performs a random access procedure to the target base station through the layer devices 1021 of the second bearer and receives a random access response, When the UE performs a random access procedure to the target base station through the layer devices of the second bearer, receives a random access response, and configures and transmits a handover completion message to the target base station, When the UE completes the random access procedure to the target base station through the layer devices of the second bearer and transmits data for the first time with a PUCCH or PUSCH uplink transmission resource, When the base station sets a separate timer to the UE with an RRC message and the timer has expired, When the UE receives a handover command message from the source base station, starts random access to the target base station (when the UE transmits a preamble), receives a random access response from the target base station, transmits a handover completion message to the target base station, or transmits data for the first time with a PUCCH or PUSCH uplink transmission resource, the timer may be started.

In the above description, when it is characterized that the UE may continue to receive downlink data from the source base station and the target base station through the protocol layer devices of the first bearer and the second bearer, it may be characterized that continuous uplink transmission of a non-data RLC status report to the source base station (or target base station) is allowed through protocol layer devices of the first bearer (or second bearer) for AM bearers so that downlink data may be smoothly received from the source base station (or target base station) or so that the source base station (or target base station) may smoothly transmit downlink data. This is because, in the case of AM bearers, after data is transmitted to the transmitting end, when successful delivery is not indicated by the RLC status report (i.e., when the RLC status report is not received), data cannot be continuously transmitted thereafter.

In the fifth embodiment of the efficient handover method of FIG. 10, when the first condition is satisfied in fourth step 1004, it may be characterized that the UE 1020 stops receiving downlink data from the source base station 1005 through the protocol layer devices 1022 of the first bearer. In the above description, the first condition may be one of the following conditions. Further, the PDCP layer device 1021 of the second bearer may continue to perform data transmission and reception without interruption with the target base station using information such as transmission and reception data, serial number information, or header compression and decompression context stored in the PDCP layer device 1022 of the first bearer.

When the UE performs a random access procedure to the target base station through the layer devices 1021 of the second bearer and receives a random access response, When the UE performs a random access procedure to the target base station through the layer devices of the second bearer, receives a random access response, and configures and transmits a handover completion message to the target base station, When the UE completes the random access procedure to the target base station through the layer devices of the second bearer and transmits data for the first time with a PUCCH or PUSCH uplink transmission resource, When the base station sets a separate timer to the UE with an RRC message and the timer has expired, When the UE receives a handover command message from the source base station, starts random access to the target base station (when the UE transmits a preamble), receives a random access response from the target base station, transmits a handover completion message to the target base station, or transmits data for the first time with a PUCCH or PUSCH uplink transmission resource, the timer may be started.

FIG. 10 illustrates specific steps of a 5-2 embodiment of an efficient handover method for minimizing a data interruption time due to handover in the disclosure.

In the 5-2 embodiment of the efficient handover method of FIG. 10, while the UE 1020 transmits and receives data to and from the source base station 1005 in first step 1001, even if the UE 1020 receives a handover command from the source base station, in order to minimize a data interruption time generated during handover, it may be characterized that the UE 1020 may continue to transmit and receive data to and from the source base station through the protocol layer devices 1022 of the first bearer. Further, it may be characterized that the UE 1020 may preconfigure or establish protocol layer devices (PHY layer device, MAC layer device, RLC layer device, or PDCP layer device) 1021 of the second bearer for the target base station according to a configuration included in the received handover command message. It may be characterized that the second bearer may be configured and established to have the same bearer identifier as that of the first bearer so that a data interruption time does not occur for each bearer. Further, in the 5-2 embodiment, it may be characterized that the PDCP layer device of the first bearer and the PDCP layer device of the second bearer logically operate as one PDCP layer device, and a further specific operation method may be described in FIG. 11. Further, in the 5-2 embodiment, in the case in which the UE may transmit all uplink data to the source base station and the target base station, in order to prevent a coverage reduction problem due to lack of transmission power of the UE or a problem (link selection) of determining whether to request a transmission resource to which base station when transmitting uplink data and to transmit uplink data, in the 5-2 embodiment, it may be characterized that uplink data may be transmitted to only one base station of the source base station and the target base station. Therefore, it may be characterized that the UE may perform a scheduling request to only one base station of the source base station and the target base station, transmit reports (e.g., buffer status report) on a size of data to be transmitted from the PDCP layer device to only one base station of the source base station and the target base station, and receive an uplink transmission resource to transmit uplink data to only one base station. Further, even if the UE receives the handover command message from the source base station, it may be characterized that in order to prevent data loss by continuing data transmission and reception due to HARQ retransmission, the UE does not reset the MAC layer device of the first bearer.

In the 5-2 embodiment of the efficient handover method of FIG. 10, even when the UE 1020 performs a random access procedure to the target base station 1010 instructed in the handover command message through the protocol layer devices of the second bearer in second step 1002, the UE may continue to transmit and receive data (uplink data transmission and downlink data reception) to and from the source base station through the protocol layer devices of the first bearer.

In the 5-2 embodiment of the efficient handover method of FIG. 10, in third step 1003, when the second condition is satisfied, it may be characterized that the UE 1020 stops transmitting uplink data to the source base station through the protocol layer devices 1022 of the first bearer and transmits uplink data to the target base station through the protocol layer devices 1021 of the second bearer, and it may be characterized that downlink data may be continuously received from the source base station and the target base station through the protocol layer devices of the first bearer and the second bearer. In the above description, when the UE stops transmitting uplink data to the source base station through the protocol layer devices 1022 of the first bearer, the UE may perform the RLC re-establishment procedure for the transmitting RLC layer devices among the protocol layer devices. In the above description, the second condition may be one of the following conditions. Further, the PDCP layer device 1021 of the second bearer may continue to perform data transmission and reception without interruption with the target base station using information such as transmission and reception data, serial number information, or header compression and decompression context stored in the PDCP layer device 1022 of the first bearer.

When the UE performs a random access procedure to the target base station through the layer devices 1021 of the second bearer and receives a random access response, When the UE performs a random access procedure to the target base station through the layer devices of the second bearer, receives a random access response, and configures and transmits a handover completion message to the target base station, When the UE completes the random access procedure to the target base station through the layer devices of the second bearer and transmits data for the first time with a PUCCH or PUSCH uplink transmission resource, When the base station sets a separate timer to the UE with an RRC message and the timer has expired, When the UE receives a handover command message from the source base station, starts random access to the target base station (when the UE transmits a preamble), receives a random access response from the target base station, transmits a handover completion message to the target base station, or transmits data for the first time with a PUCCH or PUSCH uplink transmission resource, the timer may be started.

In the above description, when it is characterized that the UE may continue to receive downlink data from the source base station and the target base station through the protocol layer devices of the first bearer and the second bearer, it may be characterized that continuous uplink transmission of non-data RLC status report is allowed to the source base station (or target base station) through protocol layer devices of the first bearer (or second bearer) for AM bearers so that downlink data may be smoothly received from the source base station (or the target base station) or so that the source base station (or target base station) may smoothly transmit downlink data. This is because, in the case of AM bearers, after data is transmitted to the transmitting end, when successful delivery is not indicated by the RLC status report (i.e., when the RLC status report is not received), data cannot be continuously transmitted thereafter.

In the 5-2 embodiment of the efficient handover method of FIG. 10, when a first condition is satisfied in fourth step 1004, it may be characterized that the UE 1022 stops receiving downlink data from the source base station 1005 through the protocol layer devices 1022 of the first bearer. In the above description, the first condition may be one of the following conditions. Further, the PDCP layer device 1021 of the second bearer may continue to perform data transmission and reception without interruption with the target base station using information such as transmission and reception data, serial number information, or header compression and decompression context stored in the PDCP layer device 1022 of the first bearer.

When the UE performs a random access procedure to the target base station through the layer devices 1021 of the second bearer and receives a random access response, When the UE performs a random access procedure to the target base station through the layer devices of the second bearer, receives a random access response, and configures and transmits a handover completion message to the target base station, When the UE completes the random access procedure to the target base station through the layer devices of the second bearer and transmits data for the first time with a PUCCH or PUSCH uplink transmission resource, When the base station sets a separate timer to the UE with an RRC message and the timer has expired, When the UE receives a handover command message from the source base station, starts random access to the target base station (when the UE transmits a preamble), receives a random access response from the target base station, transmits a handover completion message to the target base station, or transmits data for the first time with a PUCCH or PUSCH uplink transmission resource, the timer may be started.

In FIG. 6 of the disclosure, when the base station transmits the handover command message 620 to the UE, the handover command message (e.g., RRCReconfiguration message) may define indicators for the embodiments proposed in the present disclosure and indicate to the UE whether to trigger the handover procedure corresponding to which embodiment, and the UE may perform the handover procedure according to the handover method instructed in the handover command message and perform handover to the target base station while minimizing a data interruption time.

In the embodiments of the disclosure, when the UE performs data transmission and reception with the source base station through the protocol layer devices of the first bearer and performs data transmission and reception with the target base station through the protocol layer devices of the second bearer, the MAC layer device of the first bearer and the MAC layer device of the second bearer may each operate a separate discontinuous reception (DRX) cycle to reduce battery consumption of the UE. That is, when the UE transmits and receives data through the protocol layer devices of the first bearer, the UE may continue to apply the DRX cycle of the MAC layer device even after receiving the handover command message, and stop DRX according to the first condition or the second condition of the disclosure. Further, the UE may separately operate the application of the DRX cycle to the MAC layer device of the second bearer according to the instruction of the target base station.

Further, in the disclosure, the meaning that the UE stops uplink transmission to the source base station through the protocol layer devices of the first bearer and stops downlink transmission from the source base station means that the UE re-establishes, reset, or releases the protocol layer devices of the first bearer.

In the embodiments of the disclosure, for convenience of description, it has been described that the UE configures a first bearer for the source base station or a second bearer for the target base station, and it may be easily extended to a case in which the UE configures a plurality of first bearers for the source base station or a plurality of second bearers for the target base station, and may be equally applied.

Figure 11:
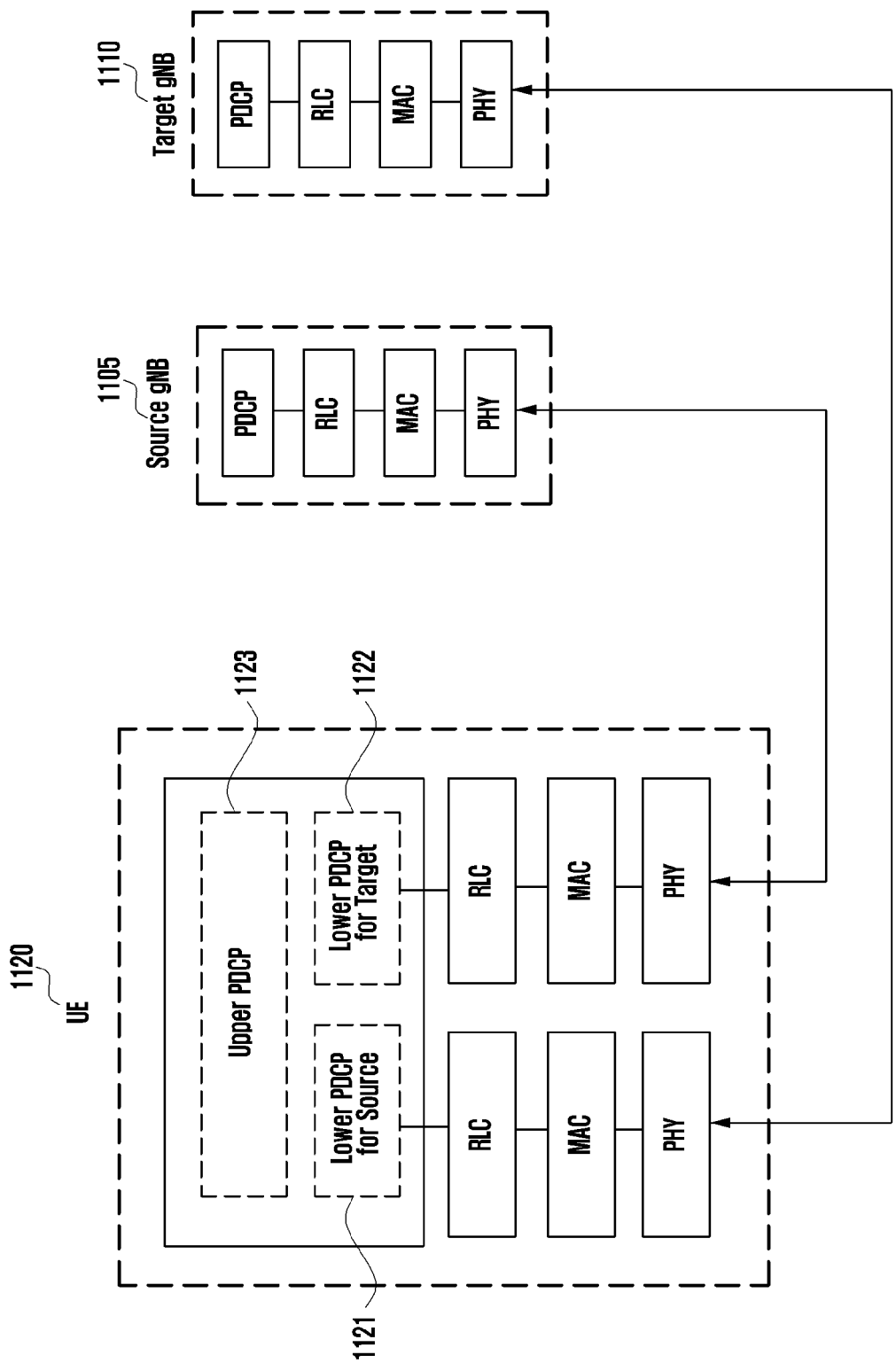
FIG. 11 is a diagram illustrating a structure of an efficient PDCP layer device that can be applied to embodiments of the disclosure.

FIG. 11 is a diagram illustrating a structure of an efficient PDCP layer device that can be applied to embodiments of the disclosure.

The disclosure may propose a structure of an efficient PDCP layer device as illustrated in FIG. 11. The structure of the PDCP layer device of FIG. 11 may be applied to a second embodiment, a third embodiment, a fourth embodiment, or a fifth embodiment of an efficient handover method for minimizing a data interruption time proposed in the disclosure.

In FIG. 11, a UE 1120 may perform data transmission and reception with a source base station 1105 through protocol layer devices of a first bearer, and simultaneously perform data transmission and reception with a target base station 1110 through protocol layer devices of a second bearer.

In the above description, each of the PDCP layer device of the first bearer and the PDCP layer device of the second bearer may be configured in the UE, but may logically operate as one PDCP layer device, as illustrated in FIG. 11. Specifically, the one PDCP layer device may divide functions of the PDCP layer device to be implemented into an upper PDCP layer device 1123 and two lower PDCP layer devices 1121 and 1122 for each source base station and each target base station.

In the above description, the upper transmitting PDCP layer device 1123 may perform a role of allocating a PDCP serial number to data received from the higher layer device. The upper transmitting PDCP layer device 1123 may also perform header compression. In two lower transmitting PDCP layer devices 1121 and 1122 for each source base station and each target base station, when integrity protection is established using a separate security key set with each source base station and each target base station, transmission may be performed by applying an integrity protection procedure to the PDCP header and data (PDCP SDU), applying an ciphering procedure, and delivering it to the transmitting RLC layer device of the first bearer or the transmitting RLC layer device of the second bearer. In the above description, it may be characterized that the two lower transmitting PDCP layer devices 1121 and 1122 may perform parallel processing that performs a header compression, integrity protection, or ciphering procedure in parallel in order to accelerate a data processing speed, and it may be characterized that the two lower transmitting PDCP layer devices perform the integrity protection or ciphering procedure using different security keys. Further, it may be characterized that integrity protection or ciphering procedures of different data are performed by logically applying different security keys or security algorithms within one transmitting PDCP layer device.

In the above description, the upper receiving PDCP layer device 1123 may perform a role of performing a duplicate detection function based on the PDCP serial number for data received from lower layer devices, or aligning the received data in ascending order of the PDCP serial number and delivering the received data in order to the upper layer. The upper receiving PDCP layer device 1123 may also perform header decompression. In two lower receiving PDCP layer devices 1121 and 1122 for each source base station and each target base station, when integrity protection is established using a separate security key set with each source base station and each target base station, data processing may be performed by applying an integrity verification procedure to the PDCP header and data (PDCP SDU), applying a deciphering procedure to the PDCP header and data (PDCP SDU), and delivering to the PDCP header and data (PDCP SDU) to the upper receiving PDCP layer device. In the two lower receiving PDCP layer devices, in order to reduce unnecessary integrity verification or deciphering procedures, a procedure of driving a window based on the PDCP serial number to discard data outside the window, and discarding duplicate data may be performed first, and the integrity verification or deciphering procedure may be performed only for valid data within the window. It may be characterized that the two lower receiving PDCP layer devices may perform parallel processing that performs header compression, integrity protection, or ciphering procedure in parallel in order to accelerate a data processing speed in the two lower transmitting PDCP layer devices 1121 and 1122 based on the PDCP serial number, and it may be characterized that the two lower transmitting PDCP layer devices may perform the integrity protection or ciphering procedure using different security keys. Further, it may be characterized that integrity protection or ciphering procedures of different data are performed by logically applying different security keys or security algorithms within one transmitting PDCP layer device. Further, it may be characterized that the lower receiving PDCP layer devices may perform an out-of-sequence deciphering or integrity verification procedure on each data received regardless of the order of the PDCP serial numbers.

Figure 12:
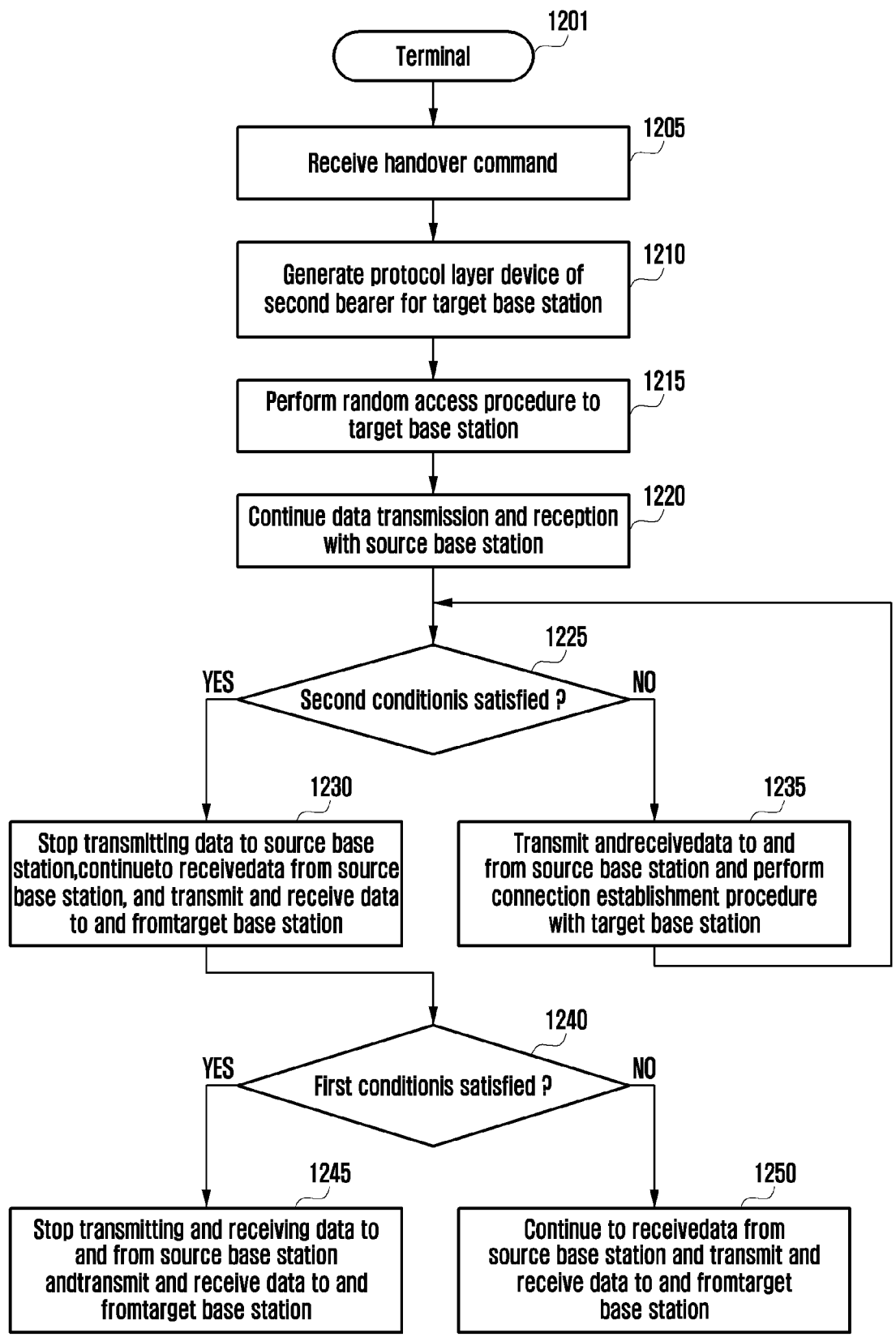
FIG. 12 is a flowchart illustrating an operation of a UE that can be applied to embodiments proposed in the disclosure.

FIG. 12 is a flowchart illustrating an operation of a UE that can be applied to embodiments proposed in the disclosure.

In FIG. 12, when a UE receives a handover command message (1205), even when the UE configures and establishes protocol layer devices of a second bearer to a target base station indicated in the message, and performs a random access procedure to the target base station through the established protocol layer devices (1210, 1215), the UE may continue data transmission and reception (uplink data transmission and downlink data reception) with the source base station through the protocol layer devices of the first bearer (1220).

When a second condition is satisfied, it is characterized that the UE stops transmitting uplink data to the source base station through protocol layer devices of a first bearer, and transmits uplink data to the target base station through the protocol layer devices 1021 of a second bearer, and it is characterized that downlink data may be continuously received from the source base station and the target base station through the protocol layer devices of the first bearer and the second bearer (1230). In the above description, the second condition may be one of the following conditions. Further, the PDCP layer device 1021 of the second bearer may continue to perform data transmission and reception without interruption with the target base station using information such as transmission and reception data, serial number information, or header compression and decompression context stored in the PDCP layer device 1022 of the first bearer.

When the UE performs a random access procedure to the target base station through the layer devices 1021 of the second bearer and receives a random access response, When the UE performs a random access procedure to the target base station through layer devices of the second bearer, receives a random access response, and configures and transmits a handover completion message to the target base station, When the UE completes the random access procedure to the target base station through the layer devices of the second bearer and transmits data for the first time with a PUCCH or PUSCH uplink transmission resource, When the base station sets a separate timer to the UE with an RRC message and the timer has expired, When the UE receives a handover command message from the source base station, starts random access to the target base station (when the UE transmits a preamble), receives a random access response from the target base station, transmits a handover completion message to the target base station, or transmits data for the first time with a PUCCH or PUSCH uplink transmission resource, the timer may be started.

In the above description, when the second condition is not satisfied, the UE may continue to check the second condition while continuing the previously performing procedure.

Further, when the first condition is satisfied, it may be characterized that the UE may stop receiving downlink data from the source base station 1005 through the protocol layer devices of the first bearer (1245). In the above description, the first condition may be one of the following conditions. Further, the PDCP layer device 1021 of the second bearer may continue to perform data transmission and reception without interruption with the target base station using information such as transmission and reception data, serial number information, or header compression and decompression context stored in the PDCP layer device 1022 of the first bearer.

When the UE performs a random access procedure to the target base station through the layer devices 1021 of the second bearer and receives a random access response, When the UE performs a random access procedure to the target base station through the layer devices of the second bearer, receives a random access response, and configures and transmits a handover completion message to the target base station, When the UE completes a random access procedure to the target base station through the layer devices of the second bearer and transmits data for the first time with a PUCCH or PUSCH uplink transmission resource, When the base station sets a separate timer to the UE with an RRC message and the timer has expired, When the UE receives a handover command message from the source base station, starts random access to the target base station (when the UE transmits a preamble), receives a random access response from the target base station, transmits a handover completion message to the target base station, or transmits data for the first time with a PUCCH or PUSCH uplink transmission resource, the timer may be started.

In the above description, when the first condition is not satisfied, the UE may continue to check the first condition while continuing the previously performing procedure.

Figure 13:
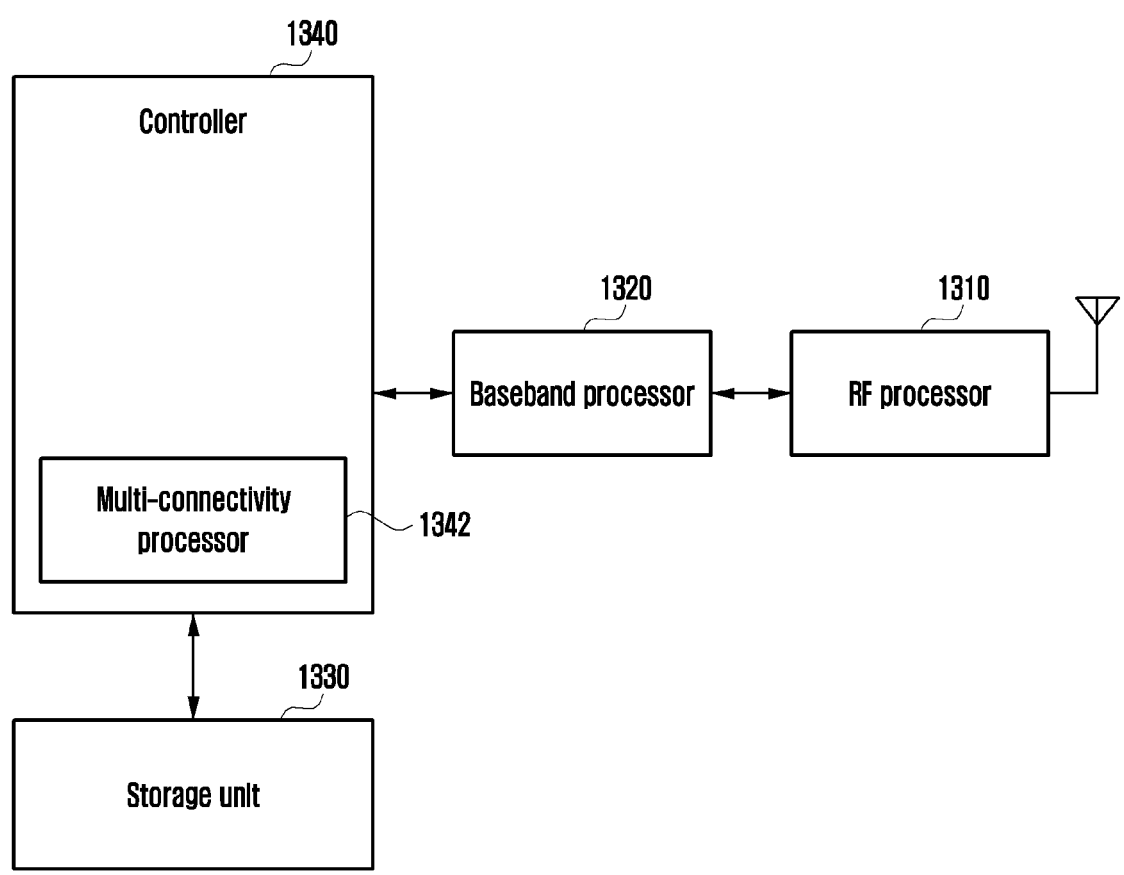
FIG. 13 is a block diagram illustrating a structure of a UE to which an embodiment of the disclosure can be applied.

FIG. 13 is a block diagram illustrating a structure of a UE to which an embodiment of the disclosure can be applied.

Referring to the drawing, the UE may include a radio frequency (RF) processor 1310, a baseband processor 1320, a storage unit 1330, and a controller 1340.

The RF processor 1310 may perform a function for transmitting and receiving a signal through a radio channel, such as band conversion and amplification of a signal. That is, the RF processor 1310 may up-convert a baseband signal provided from the baseband processor 1320 to an RF band signal, transmits the RF band signal through an antenna, and down-convert the RF band signal received through the antenna to a baseband signal. For example, the RF processor 1310 may include a transmission filter, a reception filter, an amplifier, a mixer, an oscillator, a digital to analog converter (DAC), an analog to digital converter (ADC), and the like. In the drawing, only one antenna is illustrated, but the UE may include a plurality of antennas. Further, the RF processor 1310 may include a plurality of RF chains. Furthermore, the RF processor 1310 may perform beamforming. For the beamforming, the RF processor 1310 may adjust a phase and magnitude of each of signals transmitted and received through a plurality of antennas or antenna elements. Further, the RF processor may perform MIMO, and receive multiple layers when performing a MIMO operation. The RF processor 1310 may appropriately configure a plurality of antennas or antenna elements under the control of the controller to perform receiving beam sweeping, or may adjust a direction and beam width of the receiving beam so that the receiving beam cooperates with a transmitting beam.

The baseband processor 1320 may perform a function of converting between a baseband signal and a bit string according to a physical layer standard of a system. For example, when transmitting data, by ciphering and modulating a transmitted bit string, the baseband processor 1320 may generate complex symbols. Further, when receiving data, by demodulating and deciphering the baseband signal provided from the RF processor 1310, the baseband processor 1320 may restore a received bit string. For example, according to an orthogonal frequency division multiplexing (OFDM) scheme, when transmitting data, by ciphering and modulating a transmitted bit string, the baseband processor 1320 may generate complex symbols, map the complex symbols to subcarriers, and then configure OFDM symbols through inverse fast Fourier transform (IFFT) operation and cyclic prefix (CP) insertion. Further, when receiving data, the baseband processor 1320 may divide the baseband signal provided from the RF processor 1310 into OFDM symbol units, restore the signals mapped to subcarriers through a fast Fourier transform (FFT) operation, and restore the received bit string through demodulation and deciphering.

The baseband processor 1320 and the RF processor 1310 may transmit and receive signals, as described above. Accordingly, the baseband processor 1320 and the RF processor 1310 may be referred to as a transmitter, a receiver, a transceiver, or a communication unit. Furthermore, at least one of the baseband processor 1320 and the RF processor 1310 may include a plurality of communication modules to support a plurality of different wireless access technologies. Further, at least one of the baseband processor 1320 and the RF processor 1310 may include different communication modules to process signals of different frequency bands. For example, the different radio access technologies may include an LTE network, an NR network, and the like. Further, the different frequency bands may include a super high frequency (SHF) (e.g., 2.5 GHz, 5 GHz) band and a millimeter wave (e.g., 60 GHz) band.

The storage unit 1330 may store data such as a basic program, an application program, and configuration information for an operation of the UE. The storage unit 1330 may provide stored data according to the request of the controller 1340.

The controller 1340 may control overall operations of the UE. For example, the controller 1340 may transmit and receive signals through the baseband processor 1320 and the RF processor 1310. Further, the controller 1340 writes and reads data in the storage unit 1330. To this end, the controller 1340 may include at least one processor. For example, the controller 1340 may include a communication processor (CP) that controls for communication and an application processor (AP) that controls an upper layer such as an application program. The controller 1340 may further include a multi-connectivity processor 1342 for supporting multiple connectivity.

Figure 14:
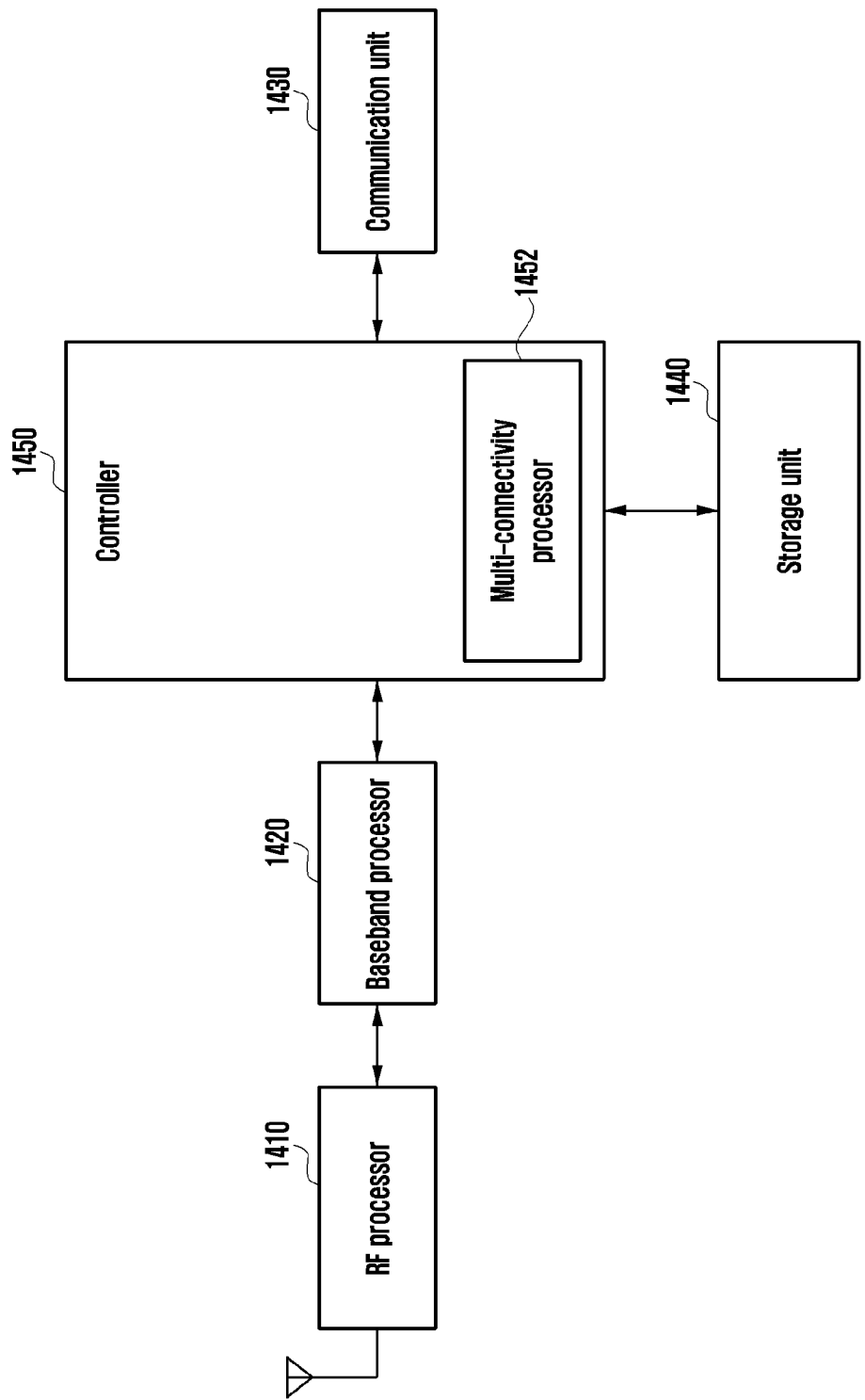
FIG. 14 is a block diagram illustrating a structure of a base station (or TRP) in a wireless communication system to which an embodiment of the disclosure can be applied.

FIG. 14 is a block diagram of a base station (or TX/RX Point (TRP)) in a wireless communication system to which an embodiment of the disclosure can be applied.

As illustrated in the drawing, the base station may include an RF processor 1410, a baseband processor 1420, a backhaul communication unit 1430, a storage unit 1440, and a controller 1450.

The RF processor 1410 may perform a function for transmitting and receiving a signal through a radio channel, such as band conversion and amplification of the signal. That is, the RF processor 1410 may up-convert a baseband signal provided from the baseband processor 1420 to an RF band signal, transmits the RF band signal through an antenna, and down-convert the RF band signal received through the antenna to a baseband signal. For example, the RF processor 1410 may include a transmission filter, a reception filter, an amplifier, a mixer, an oscillator, a DAC, an ADC, and the like. Although only one antenna is illustrated in the drawing, a first access node may include a plurality of antennas. Further, the RF processor 1410 may include a plurality of RF chains. Furthermore, the RF processor 1410 may perform beamforming. For the beamforming, the RF processor 1410 may adjust a phase and magnitude of each of signals transmitted and received through a plurality of antennas or antenna elements. The RF processor may perform a downlink MIMO operation by transmitting one or more layers.

The baseband processor 1420 may perform a conversion function between a baseband signal and a bit string according to a physical layer standard of first radio access technology. For example, when transmitting data, by ciphering and modulating a transmitted bit string, the baseband processor 1420 may generate complex symbols. Further, when receiving data, by demodulating and deciphering a baseband signal provided from the RF processor 1410, the baseband processor 1420 may restore a received bit string. For example, according to the OFDM scheme, when transmitting data, by ciphering and modulating a transmitted bit string, the baseband processor 1420 may generate complex symbols, map the complex symbols to subcarriers, and configure OFDM symbols through IFFT operation and CP insertion. Further, when receiving data, the baseband processor 1420 divides the baseband signal provided from the RF processor 1410 into OFDM symbol units, restores signals mapped to subcarriers through an FFT operation, and restore the received bit string through demodulating and deciphering. The baseband processor 1420 and the RF processor 1410 may transmit and receive signals, as described above. Accordingly, the baseband processor 1420 and the RF processor 1410 may be referred to as a transmitter, a receiver, a transceiver, a communication unit, or a RF unit.

The communication unit 1430 may provide an interface for performing communication with other nodes in the network.

The storage unit 1440 may store data such as a basic program, an application program, and configuration information for an operation of the main station. In particular, the storage unit 1440 may store information on a bearer allocated to an accessed UE, a measurement result reported from the accessed UE, and the like. Further, the storage unit 1440 may store information to be a criterion for determining whether to provide or stop multiple connections to the UE. The storage unit 1440 may provide stored data according to a request of the controller 1450.

The controller 1450 may control overall operations of the main station. For example, the controller 1450 may transmit and receive a signal through the baseband processor 1420 and the RF processor 1410 or through the backhaul communication unit 1430. Further, the controller 1450 writes and reads data in the storage unit 1440. To this end, the controller 1450 may include at least one processor. The controller 1450 may further include a multi-connectivity processor 1452 for supporting multiple connectivity.

The invention claimed is:

1. A method performed by a terminal in a wireless communication system, the method comprising:
   receiving, from a source base station, a radio resource control (RRC) reconfiguration message indicating to the terminal to perform a handover to a target base station, the RRC reconfiguration message including bearer configuration information configuring a bearer for dual active protocol stacks;
   generating a second medium access control (MAC) entity for the target base station based on the bearer configuration information, while a first MAC entity for the source base station is not reset based on the RRC reconfiguration message;
   performing a random access procedure with the target base station through the second MAC entity based on the RRC reconfiguration message;
   performing uplink data transmission and downlink data reception with the source base station until the random access procedure is completed; and
   performing uplink data transmission and downlink data reception with the target base station, after the random access procedure is completed,
   while the downlink data reception from the source base station is maintained,
   wherein the uplink data transmission to the source base station is switched to the target base station, after the random access procedure is completed.

2. The method of claim 1, further comprising generating a second radio link control (RLC) entity for the target base station based on the bearer configuration information.

3. The method of claim 1, further comprising transmitting, to the source base station, at least one of an RLC status report for downlink data received from the source base station, a hybrid automatic repeat request (HARQ) response to downlink data received from the source base station, or HARQ retransmission for uplink data transmitted to the source base station, even after the uplink data transmission to the source base station is switched to the target base station, while the first MAC entity is not reset.

4. The method of claim 1,
   wherein the first MAC entity is reset, in case that the terminal is configured to release a connection with the source base station, and
   wherein the downlink data reception from the source base station is stopped, when the first MAC entity is reset.

5. A method performed by a source base station in a wireless communication system, the method comprising:
   transmitting, to a terminal, a radio resource control (RRC) reconfiguration message indicating to the terminal to perform a handover to a target base station, the RRC reconfiguration message including bearer configuration information configuring a bearer for dual active protocol stacks;
   performing uplink data reception and downlink data transmission with the terminal until a random access procedure between the terminal and the target base station based on the RRC reconfiguration message is completed; and transmitting downlink data to the terminal after the random access procedure is completed, wherein a first medium access control (MAC) entity of the terminal for the source base station is not reset based on the RRC reconfiguration message, wherein a second MAC entity of the terminal for the target base station is generated based on the bearer configuration information, wherein the random access procedure is initiated through the second MAC entity, and wherein the uplink data reception from the terminal is stopped, after the random access procedure is completed.

6. The method of claim 5, wherein a second radio link control (RLC) for the target base station is generated based on the bearer configuration information.

7. The method of claim 5, further comprising receiving, from the terminal, at least one of an RLC status report for downlink data transmitted to the terminal, a hybrid automatic repeat request (HARQ) response to downlink data transmitted to the terminal, or HARQ retransmission for uplink data received from the terminal, after the random access procedure is completed, while the first MAC entity of the terminal is not reset.

8. A terminal for a wireless communication system, the terminal comprising:

a transceiver configured to transmit and receive a signal; and a controller connected to the transceiver, wherein the controller is configured to:

receive, from a source base station, a radio resource control (RRC) reconfiguration message indicating to the terminal to perform a handover to a target base station, the RRC reconfiguration message including bearer configuration information configuring a bearer for dual active protocol stacks, generate a second medium access control (MAC) entity for the target base station based on the bearer configuration information, while a first MAC entity for the source base station is not reset based on the RRC reconfiguration message, perform a random access procedure with the target base station through the second MAC entity based on the RRC reconfiguration message, perform uplink data transmission and downlink data reception with the source base station until the random access procedure is completed, and perform uplink data transmission and downlink data reception with the target base station, after the random access procedure is completed, while the downlink data reception from the source base station is maintained, wherein the uplink data transmission to the source base station is switched to the target base station, after the random access procedure is completed.

9. The terminal of claim 8, wherein the controller is configured to generate a second radio link control (RLC) entity for the target base station based on the bearer configuration information.

10. The terminal of claim 8, wherein the controller is configured to transmit, to the source base station, at least one of an RLC status report for downlink data received from the source base station, a hybrid automatic repeat request (HARQ) response to downlink data received from the source base station, or HARQ retransmission for uplink data transmitted to the source base station, even after the uplink data transmission to the source base station is switched to the target base station, while the first MAC entity is not reset.

11. The terminal of claim 8, wherein the first MAC entity is reset, in case that the terminal is configured to release a connection with the source base station, and wherein the downlink data reception from the source base station is stopped, when the first MAC entity is reset.

12. A source base station for a wireless communication system, the source base station comprising:

a transceiver configured to transmit and receive a signal; and a controller connected to the transceiver, wherein the controller is configured to:

transmit, to a terminal, a radio resource control (RRC) reconfiguration message indicating to the terminal to perform a handover to a target base station, the RRC reconfiguration message including bearer configuration information configuring a bearer for dual active protocol stacks, perform uplink data reception and downlink data transmission with the terminal until a random access procedure between the terminal and the target base station based on the RRC reconfiguration message is completed; and transmitting downlink data to the terminal after the random access procedure is completed, wherein a first medium access control (MAC) entity of the terminal for the source base station is not reset based on the RRC reconfiguration message, wherein a second MAC entity of the terminal for the target base station is generated based on the bearer configuration information, wherein the random access procedure is initiated through the second MAC entity, and wherein the uplink data reception from the terminal is stopped, after the random access procedure is completed.

13. The source base station of claim 12, wherein a second radio link control (RLC) entity for the target base station is generated based on the bearer configuration information.

14. The source base station of claim 12, wherein the controller is configured to receive, from the terminal, at least one of an RLC status report for downlink data transmitted to the terminal, a hybrid automatic repeat request (HARQ) response to downlink data transmitted to the terminal, or HARQ retransmission for uplink data received from the terminal, after the random access procedure is completed, while the first MAC entity of the terminal is not reset.

15. The source base station of claim 12, wherein a connection with the terminal is released, in case that the terminal is configured to release the connection with the terminal.

16. The method of claim 5, wherein a connection with the terminal is released, in case that the terminal is configured to release the connection with the terminal.

17. The method of claim 1, further comprising reconfiguring a packet data convergence protocol (PDCP) entity for the bearer with separate security and robust header compression (ROHC) header decompression functions for the source base station and the target base station, respectively, while the PDCP entity maintains functions for reordering, duplicate detection, and delivery to an upper layer, of PDCP service data unit (SDU), for both of the source base station and the target base station.

18. The method of claim 5,
wherein a packet data convergence protocol (PDCP) entity for the bearer of the terminal is reconfigured with separate security and robust header compression (ROHC) header decompression functions for the source base station and the target base station, respectively, while the PDCP entity maintains functions for reordering, duplicate detection, and delivery to an upper layer, of PDCP service data unit (SDU), for both of the source base station and the target base station.

19. The terminal of claim 8, wherein the controller is further configured to reconfigure a packet data convergence protocol (PDCP) entity for the bearer with separate security and robust header compression (ROHC) header decompression functions for the source base station and the target base station, respectively, while the PDCP entity maintains functions for reordering, duplicate detection, and delivery to an upper layer, of PDCP service data unit (SDU), for both of the source base station and the target base station.

20. The source base station of claim 12,
wherein a packet data convergence protocol (PDCP) entity for the bearer of the terminal is reconfigured with separate security and robust header compression (ROHC) header decompression functions for the source base station and the target base station, respectively, while the PDCP entity maintains functions for reordering, duplicate detection, and delivery to an upper layer, of PDCP service data unit (SDU), for both of the source base station and the target base station.

* * * * *